(12) United States Patent
Kurosawa

(10) Patent No.: US 7,734,660 B2
(45) Date of Patent: Jun. 8, 2010

(54) DATA PROCESSING DEVICE

(75) Inventor: Yasuyuki Kurosawa, Katano (JP)

(73) Assignee: Panasonic Corporation, Osaka (JP)

( * ) Notice: Subject to any disclaimer, the term of this patent is extended or adjusted under 35 U.S.C. 154(b) by 1471 days.

(21) Appl. No.: 10/529,380

(22) PCT Filed: Oct. 20, 2003

(86) PCT No.: PCT/JP03/13395

§ 371 (c)(1),
(2), (4) Date: Mar. 29, 2005

(87) PCT Pub. No.: WO2004/036906

PCT Pub. Date: Apr. 29, 2004

(65) Prior Publication Data

US 2006/0143667 A1 Jun. 29, 2006

(30) Foreign Application Priority Data

Oct. 21, 2002 (JP) ............................. 2002-305418

(51) Int. Cl.
G06F 17/30 (2006.01)
G06F 7/00 (2006.01)
(52) U.S. Cl. ..................................... 707/803
(58) Field of Classification Search .............. 707/104.1, 707/101, 102
See application file for complete search history.

(56) References Cited

U.S. PATENT DOCUMENTS 6,215,485 B1   4/2001   Phillips
6,360,368 B1 *  3/2002  Chawla ...................... 725/94
2002/0106189 A1* 8/2002  Sato et al. ..................... 386/65
2002/0135608 A1* 9/2002  Hamada et al. .............. 345/723
2002/0150383 A1* 10/2002 Kato et al. ..................... 386/69

FOREIGN PATENT DOCUMENTS

| EP | 1 011 268 A1 | 6/2000 |
|----|--------------|--------|
| EP | 1 187 475 A1 | 3/2002 |
| JP | 11-075198    | 3/1999 |
| JP | 2001-169250  | 6/2001 |
| JP | 2001-223980  | 8/2001 |
| JP | 2002-159003  | 5/2002 |
| WO | 97/39411     | 10/1997 |

OTHER PUBLICATIONS

Supplementary European Search Report dated Mar. 2, 2007, for European Application No. 03 75 4206.
International Search Report for corresponding PCT/JP2003/13395, mailed Feb. 10, 2004.

* cited by examiner

Primary Examiner—Kuen S Lu
(74) Attorney, Agent, or Firm—Renner, Otto, Boiselle & Sklar, LLP

(57) ABSTRACT

A data processor that reads and writes data from/on a storage medium. The storage medium has stored thereon a first data stream being represented by a video signal that has been encoded by a first encoding process. The data processor includes: a controller, which acquires first playlist information to manage playback of the first data stream; a stream generating section for generating a second data stream by encoding the video signal by a second encoding process, which is different from the first encoding process; and a management section for producing second playlist information based on the second data stream and the first playlist information so as to manage an order in which the second data stream is played back.

21 Claims, 29 Drawing Sheets

FIG.4
(a)
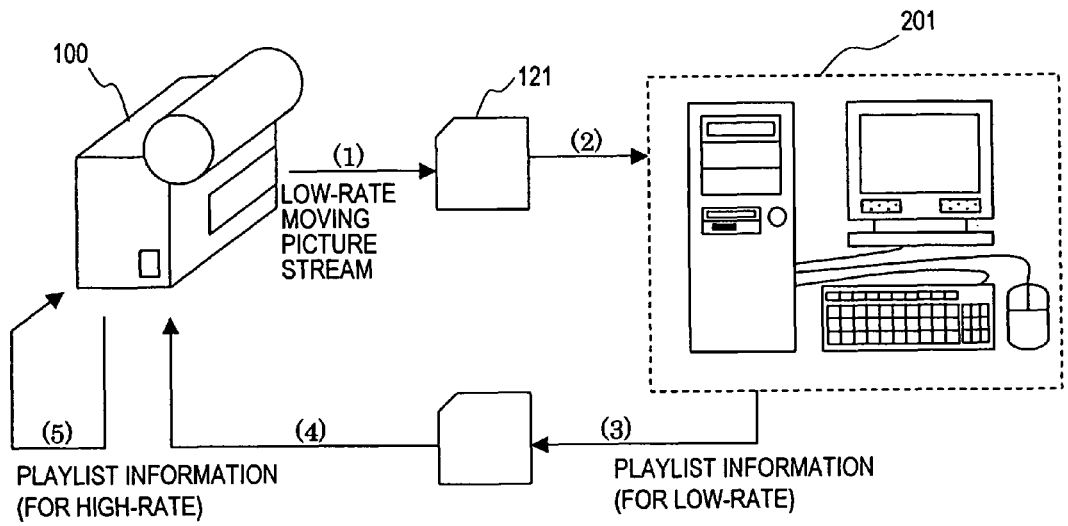
(b)
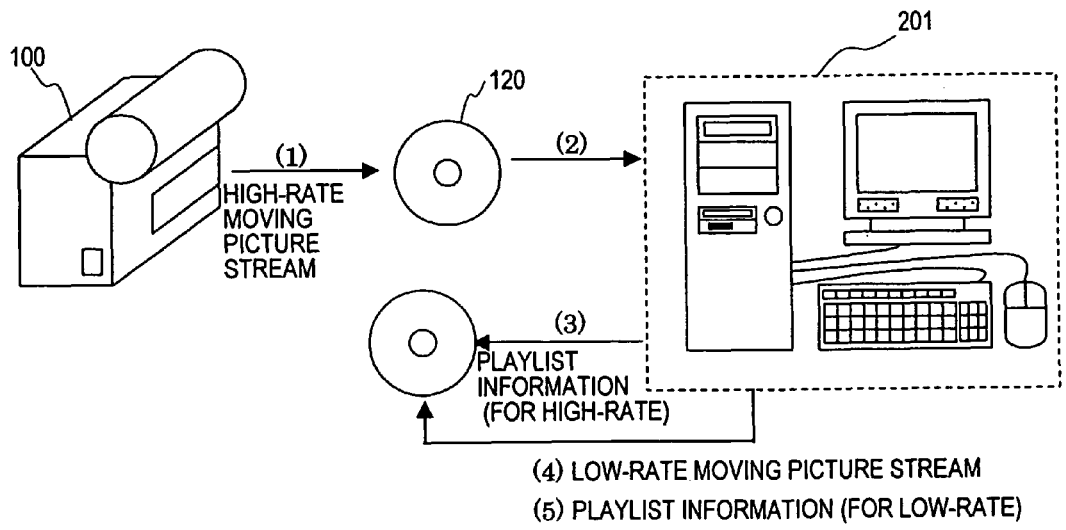

DATA PROCESSING DEVICE

CROSS REFERENCE TO RELATED APPLICATION

This Nonprovisional application is a 371 of International Patent Application No. PCT/JP03/133395, filed Oct. 20, 2003, which claims priority to Japanese Patent Application No. 2002-305418, filed Oct. 10, 2002.

TECHNICAL FIELD

The present invention relates to a data processor and processing method for writing stream data of a moving picture stream on a storage medium such as an optical disc.

BACKGROUND ART

FIG. 1 shows an arrangement of functional blocks for a conventional player 800. The player 800 plays back a moving picture stream (such as a video stream, an audio stream or a stream in which video and audio streams are multiplexed) stored on a DVD-RAM disc 810. Specifically, the player 800 carries out the process of playing back the moving picture stream as follows. First, the stream data of the moving picture stream is read out as a read signal from the DVD-RAM disc 810 by way of a pickup 807 and a playback section 804. A series of readout processing is carried out on a read location specified by a playback control section 805 and a read signal generated. Then, the read signal is decoded by a moving picture stream decoding section 803 into a video signal and an audio signal, which are supplied to a video signal output section 801 and an audio signal output section 802, respectively.

The player 800 has a playlist playback function for playing back moving picture streams in a predetermined order in accordance with playlist information. As used herein, the "playlist information" is information defining the order in which part or all of at least one moving picture stream should be played back. When the user specifies an arbitrary location or range, the playlist information is produced by a recorder. The playlist playback function can be used when the playlist information is stored on the DVD-RAM disc 810. Thus, this is a function taking advantage of the random accessibility of DVD-RAM discs.

FIGS. 2(*a*) through 2(*c*) show exemplary playback orders as defined by the playlist information. FIG. 2(*a*) shows a partial playback range specified for a single moving picture stream. Only this playback range of the moving picture stream is played back. FIG. 2(*b*) shows playback ranges and playback order for a plurality of moving picture streams. These playback ranges are played back one by one in the order as represented by the "playback order". FIG. 2(*c*) shows a range in which a video stream and an audio stream are played back synchronously with each other. If a given moving picture stream includes both a video stream and an audio stream, then the playback range of the audio stream can be specified arbitrarily with respect to an arbitrary range of the video stream. Thus, a so-called "after-recording" function is realized. In the playlist information, transition effects during video switching and text to be presented during the playback of a moving picture stream can also be defined.

A camcorder is known as an apparatus for generating a moving picture stream and playlist information and storing them on a DVD-RAM disc. Recently, some camcorders can store data on multiple storage media such as a DVD-RAM disc and a semiconductor memory card (which will be simply referred to herein as a "semiconductor memory"). Such camcorders can store a moving picture stream and/or playlist information, still picture data and so on not only on a DVD-RAM disc but also in a semiconductor memory as well. The user can easily exchange data between the camcorder and an external unit such as a PC by removing the semiconductor memory from the camcorder. Furthermore, as disclosed in Japanese Patent Application Laid-Open Publication No. 11-75198, for example, a camcorder that can store the same video as multiple moving picture streams at different data rates is also known.

Camcorders are often designed with much attention paid to their portability and handiness during video recording sessions. Accordingly, those camcorders are far from being handy for a user who is compiling a playlist. Particularly in making a complicated playlist, the user must do very difficult operations. For example, to increase their portability, a lot of camcorders have either no monitor at all or just a monitor of a small size, if any, although such a monitor would allow the user to check the video just captured. For that reason, their visibility is much lower than PC monitor's or TV screen's. Also, to increase the handiness during video recording sessions, the number and arrangement of camcorder operating switches are optimized for the video recording purposes. Thus, their handiness is poor in specifying a playback location, video transition effects and so on.

Furthermore, the playlist information is defined for each single moving picture stream. Accordingly, even if the same video were stored as multiple moving picture streams with different data rates, the user still had to make playlists for those moving picture streams separately, which is very troublesome for him or her.

DISCLOSURE OF INVENTION

An object of the present invention is to provide a processing technique of producing playlist information easily for a captured moving picture stream by managing a high-rate moving picture stream and a low-rate moving picture stream, representing the same video, in association with each other. Another object of the present invention is to provide a processing technique of reducing the processing load on a data processor that is producing the playlist information.

A data processor according to the present invention reads and writes data from/on a storage medium. The storage medium has stored thereon a first data stream being represented by a video signal that has been encoded by a first encoding process. The data processor includes: a controller, for acquiring first playlist information which is used to manage playback of the first data stream; a stream generating section for generating a second data stream by encoding the video signal by a second encoding process, which is different from the first encoding process; and a management section for producing second playlist information based on the second data stream and the first playlist information so as to manage an order in which the second data stream is played back.

The data processor may further include a first storage section for storing the first data stream on the storage medium and a second storage section for storing the second data stream on another storage medium. The stream generating section may generate the first and second data streams in parallel.

The stream generating section may generate the first and second data streams such that each said stream includes a plurality of data streams.

The controller may acquire the first playlist information that includes stream identifying information, which identifies each of more than one stream included in the first data stream, and range information, which specifies the playback range of each said stream. From the stream identifying information and the range information, the management section may produce the second playlist information that includes stream identifying information, which identifies an associated one of more than one stream included in the second data stream, and range information, which specifies the playback range of each said stream.

The controller may acquire the first playlist information that specifies a playback effect on the first data stream. The management section may produce the second playlist information that specifies another playback effect, which is different from the playback effect on the first data stream, for the second data stream.

The management section may specify the playback effect on the second data stream according to the type of the playback effect on the first data stream.

Each said range information included in the first and second playlist information may designate an I-picture, compliant with an MPEG standard, as a start position of the playback range.

The data processor may further include an encoding control section for giving an instruction on how to generate I-pictures compliant with the MPEG standard. In accordance with the instruction of the encoding control section, the stream generating section may generate the first and second data streams such that each pair of I-pictures in the first and second data streams are associated with the same video picture.

The data processor may further include an image pickup section for acquiring the video signal and a microphone for acquiring an audio signal. The stream generating section may generate the first and second data streams such that each said stream further includes the audio signal.

The data processor may further include a commanding section, which receives an instruction on the playback order of the first data stream, and a writing section for writing the first playlist information, the second data stream and the second playlist information on the storage medium. The controller may produce the first playlist information in accordance with the instruction, and the stream generating section may generate the second data stream based on the first data stream.

A data processing method according to the present invention is designed to read and write data from/on a storage medium. The storage medium has stored thereon a first data stream being represented by a video signal that has been encoded by a first encoding process. The data processing method includes steps of: acquiring first playlist information which is used to manage playback of the first data stream; generating a second data stream by encoding the video signal by a second encoding process, which is different from the first encoding process; and producing second playlist information based on the second data stream and the first playlist information so as to manage an order in which the second data stream is played back.

The data processing method may further include steps of: generating the first data stream in parallel with the second data stream; storing the first data stream on the storage medium; and storing the second data stream on another storage medium.

The step of generating the first data stream may include generating the first data stream such that the first data stream includes a plurality of data streams, and the step of generating the second data stream may include generating the second data stream such that the second data stream includes a plurality of data streams.

The step of acquiring the first playlist information may include acquiring the first playlist information that includes stream identifying information, which identifies each of more than one stream included in the first data stream, and range information, which specifies the playback range of each said stream. The step of producing the second playlist information may include producing the second playlist information that includes stream identifying information, which identifies an associated one of more than one stream included in the second data stream, and range information, which specifies the playback range of each said stream, from the stream identifying information and the range information.

The step of acquiring the first playlist information may include acquiring the first playlist information that specifies a playback effect on the first data stream, and the step of producing the second playlist information may include producing the second playlist information that specifies another playback effect, which is different from the playback effect on the first data stream, for the second data stream.

The step of producing the second playlist information may include producing the second playlist information by specifying the playback effect on the second data stream according to the type of the playback effect on the first data stream.

The range information included in each of the first and second playlist information may designate an I-picture, compliant with an MPEG standard, as a start position of the playback range.

The data processing method may further include a step of giving an instruction on how to generate I-pictures compliant with the MPEG standard. The step of generating the first data stream and the step of generating the second data stream may include generating the first and second data streams in accordance with the instruction such that each pair of I-pictures in the first and second data streams are associated with the same video picture.

The data processing method may further include steps of acquiring the video signal and acquiring an audio signal. The step of generating the first data stream and the step of generating the second data stream may include generating the first and second data streams such that each said stream further includes the audio signal.

The data processing method may further include steps of: receiving an instruction on the playback order of the first data stream; and writing the first playlist information, the second data stream and the second playlist information on the storage medium. The step of acquiring the first playlist information may include producing the first playlist information in accordance with the instruction, and the step of generating the second data stream may include generating the second data stream based on the first data stream.

A computer program according to the present invention is executed by a data processor in reading and writing data from/on a storage medium. The storage medium has stored thereon a first data stream being represented by a video signal that has been encoded by a first encoding process. This computer program instructs the data processor to execute the processing steps of: acquiring first playlist information which is used to manage playback of the first data stream; generating a second data stream by encoding the video signal by a second encoding process, which is different from the first encoding process; and producing second playlist information based on the second data stream and the first playlist information so as to manage an order in which the second data stream is played back.

BRIEF DESCRIPTION OF DRAWINGS

FIGS. 4(*a*) and 4(*b*) show the procedures of processing related to the operations of the camcorder 100 and a PC 201.

Figure 21:
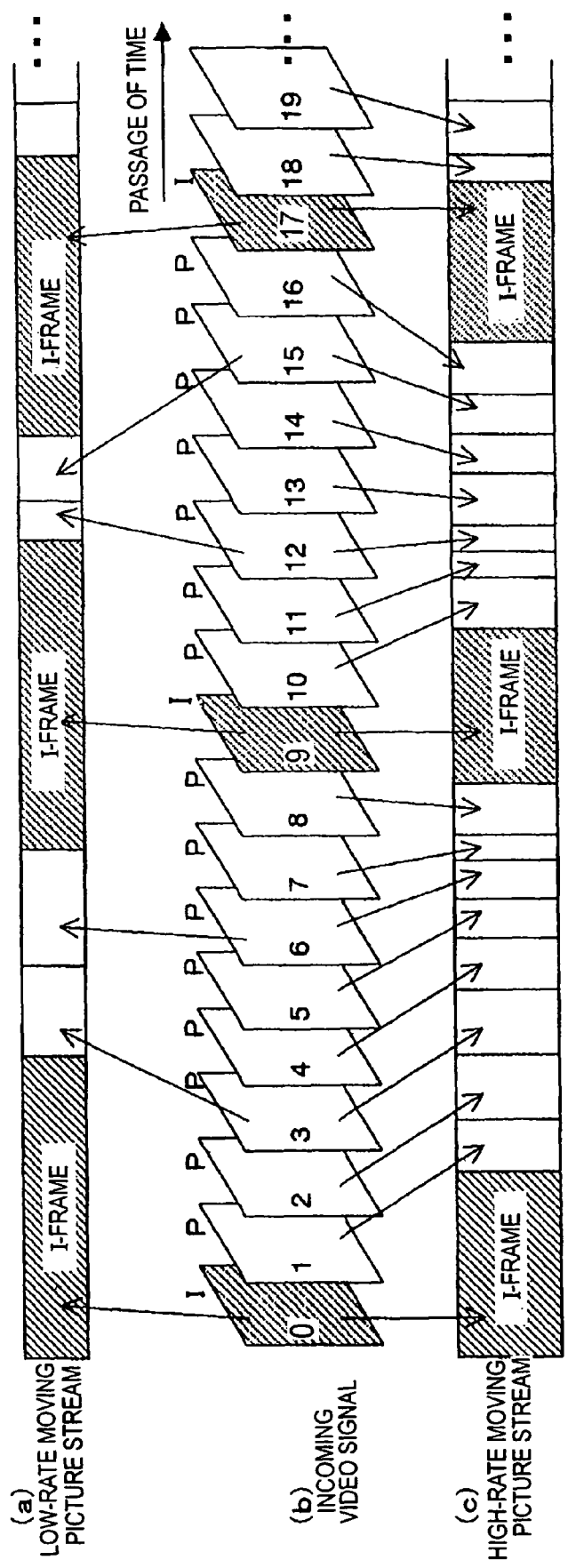

Portions (a) through (c) of FIG. 21 show a correlation between the frame data in moving picture streams and video frames.

Figure 22:
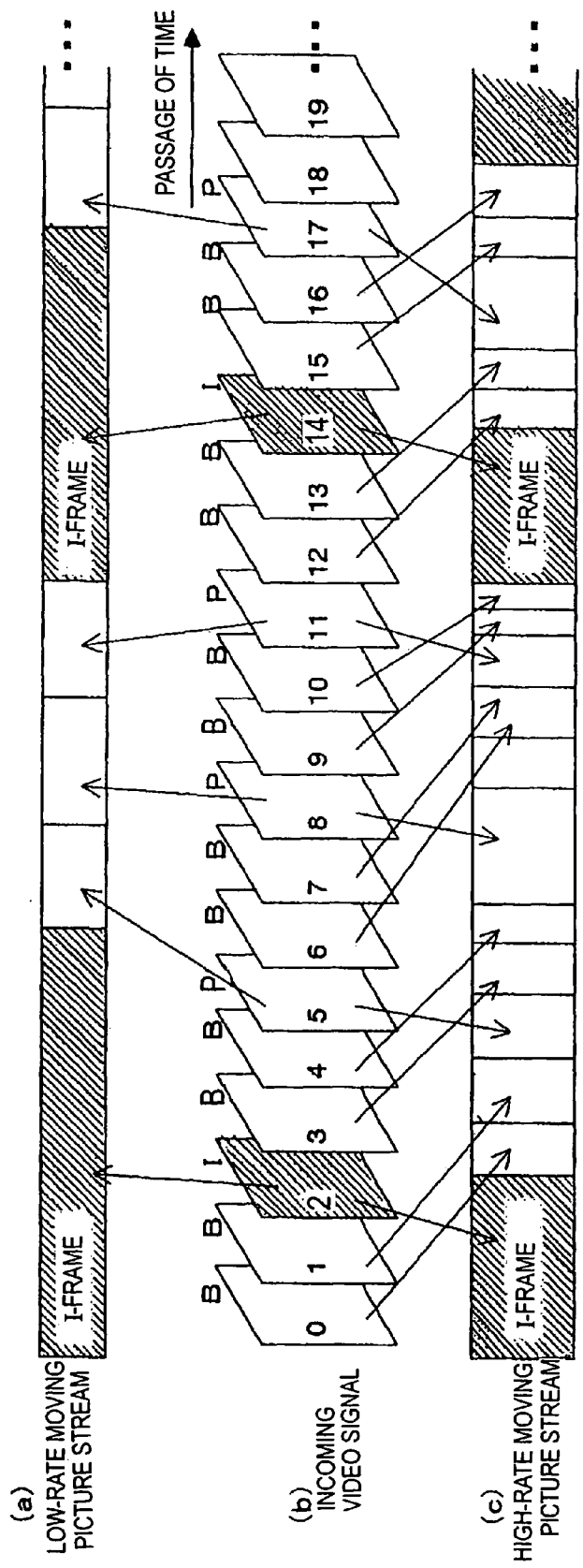

Portions (a) through (c) of FIG. 22 show a correlation between the frame data in moving picture streams and video frames, which have been encoded as I-, P- and B-frames.

Figure 23:
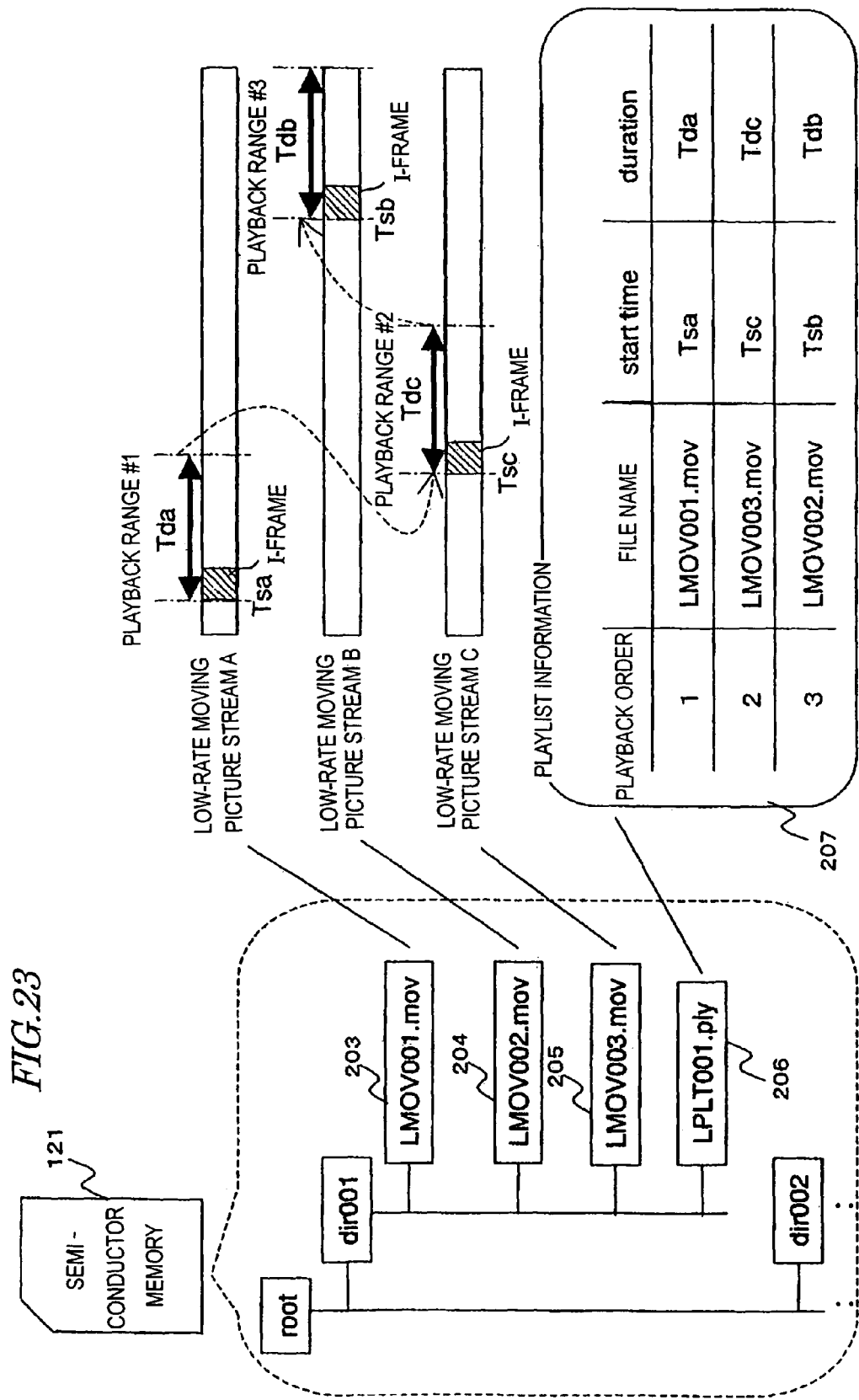

FIG. 23 shows a correlation between the low-rate moving picture streams A through C stored in the semiconductor memory 121 and playlist information 207 for low-rate playback.

Figure 24:
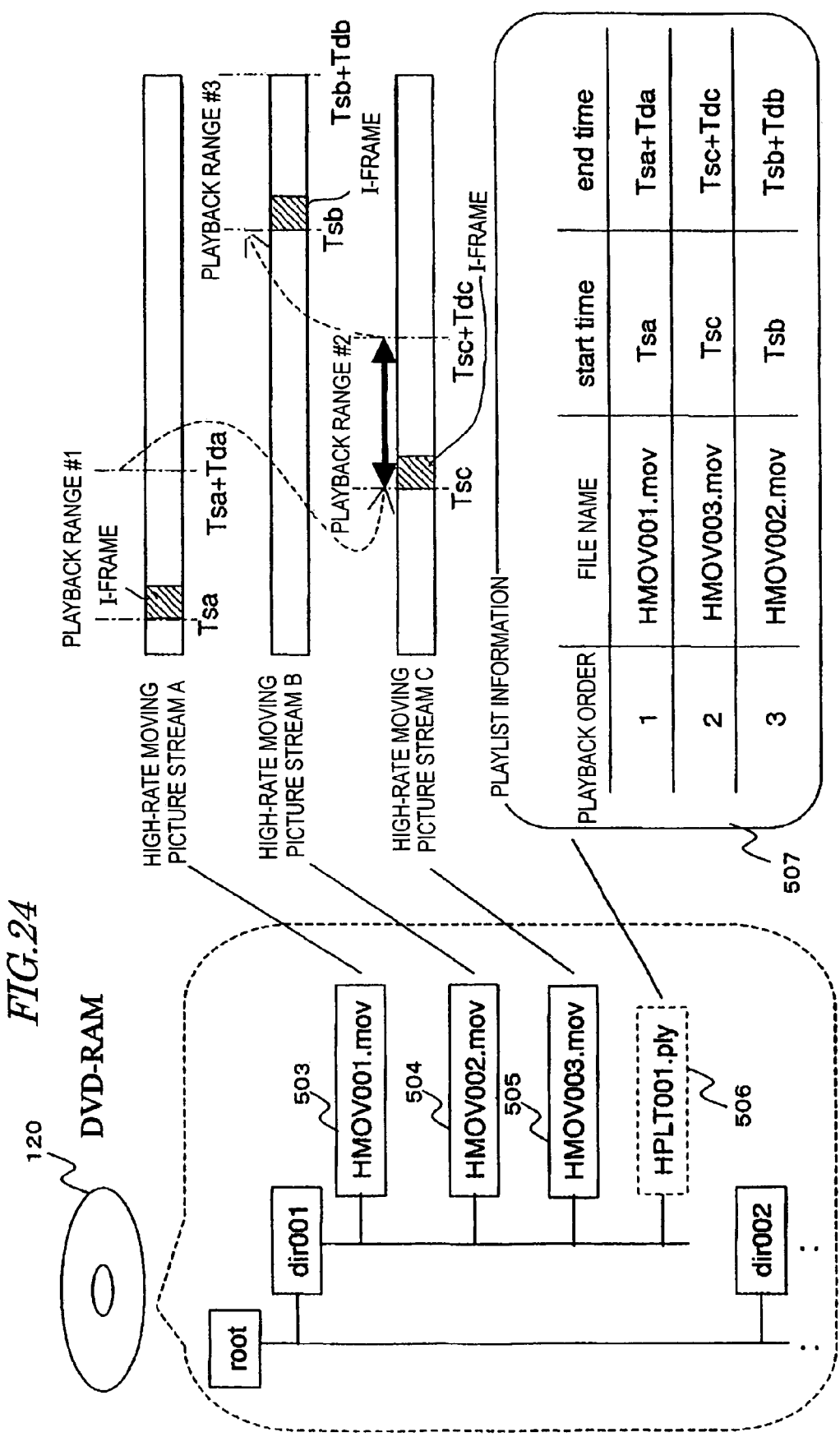

FIG. 24 shows a correlation between the high-rate moving picture streams A through C stored on the optical disc 120 and playlist information 507 for high-rate playback.

Figure 25:
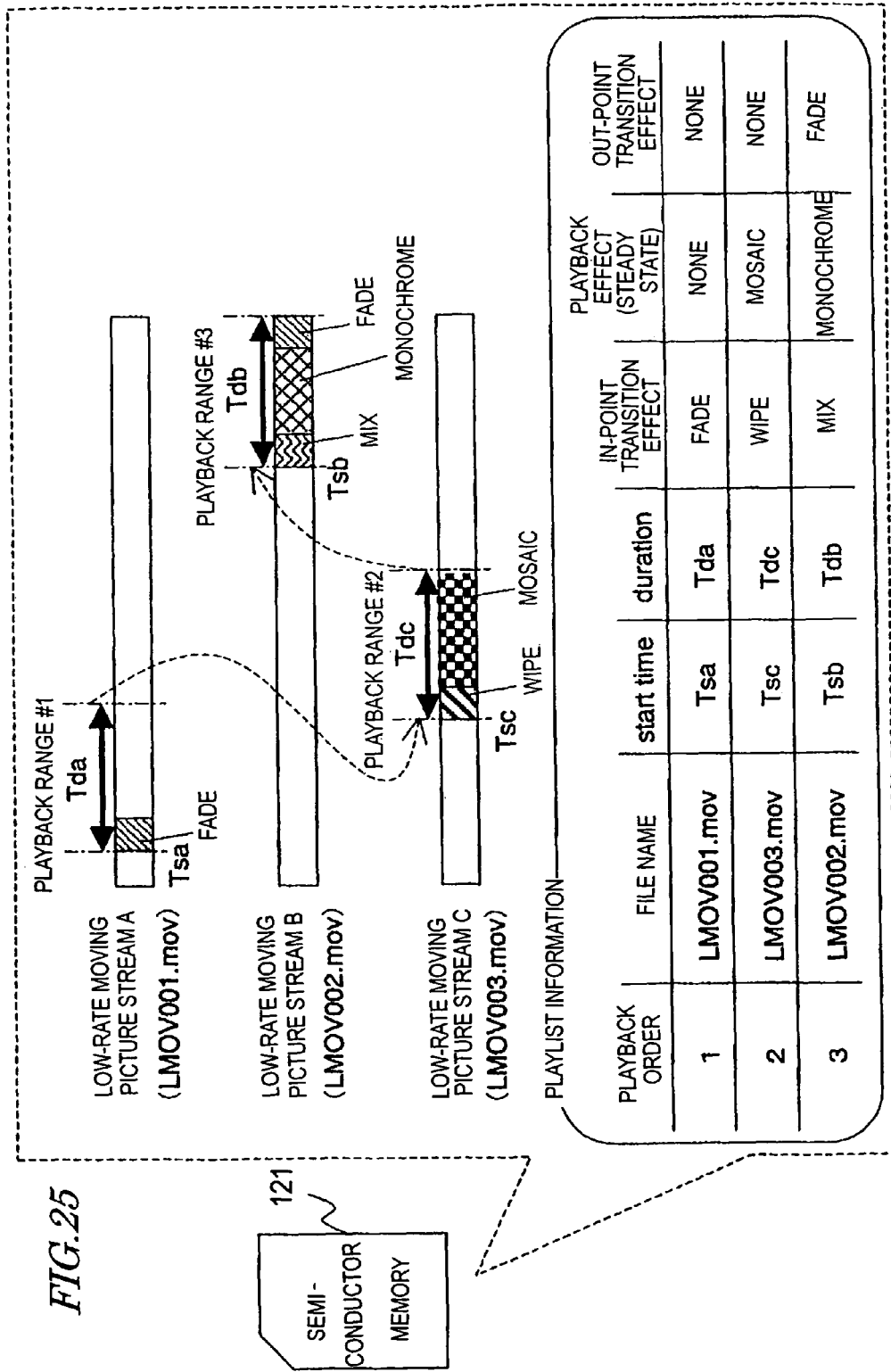

FIG. 25 shows the low-rate moving picture streams A through C stored in the semiconductor memory 121 and their playlist information.

Figure 26:
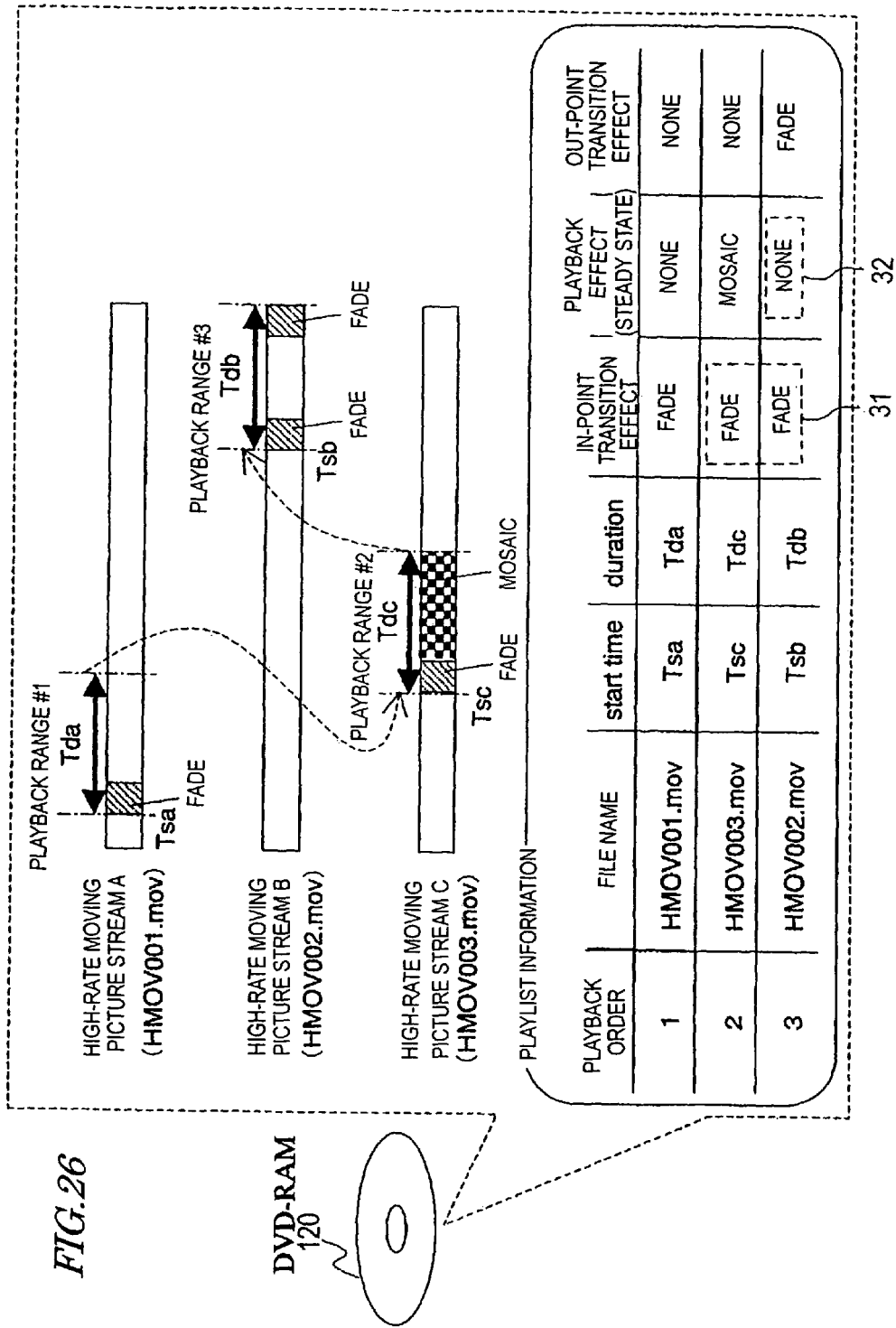

FIG. 26 shows the high-rate moving picture streams A through C stored in the semiconductor memory 121 and playlist information in which playback effects have been either changed or deleted.

Figure 27:
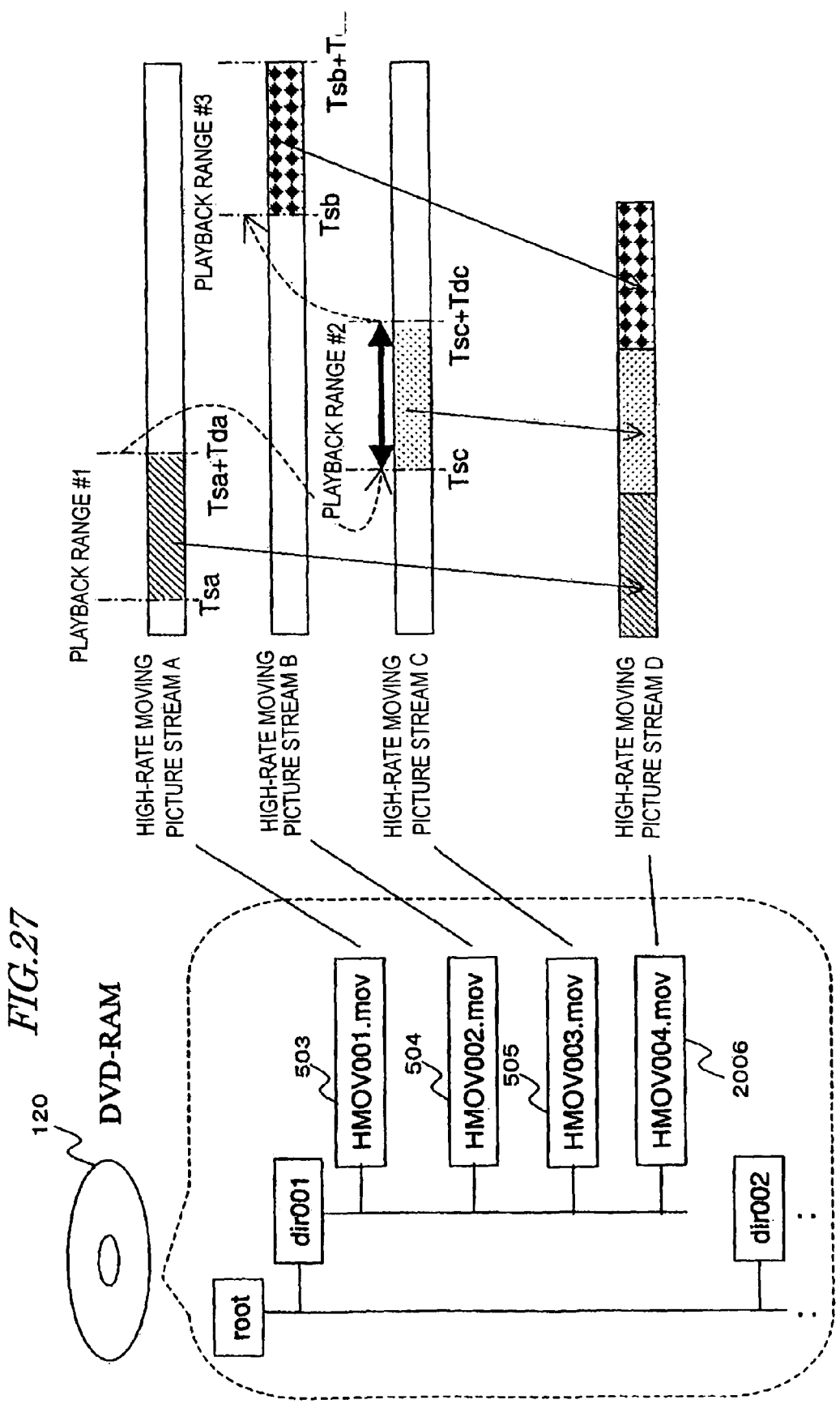

FIG. 27 shows a high-rate moving picture stream D generated by extracting respective playback ranges of the high-rate moving picture streams A through C.

Figure 28:
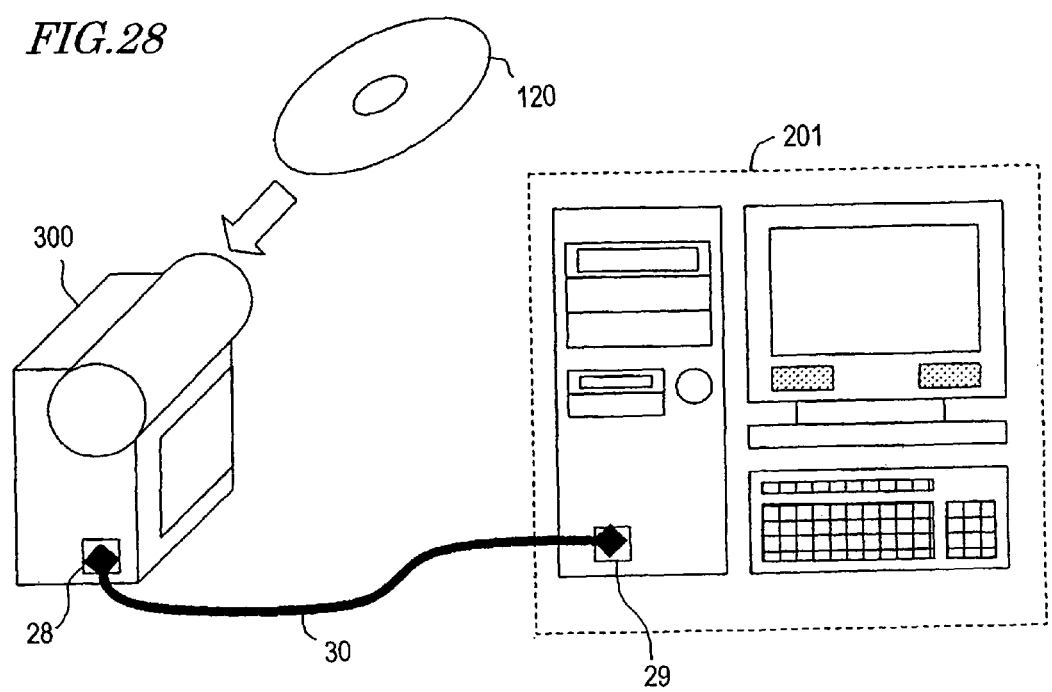

FIG. 28 shows an example in which a camcorder 300 and the PC 201 are connected together with a digital IF cable 30.

Figure 29:
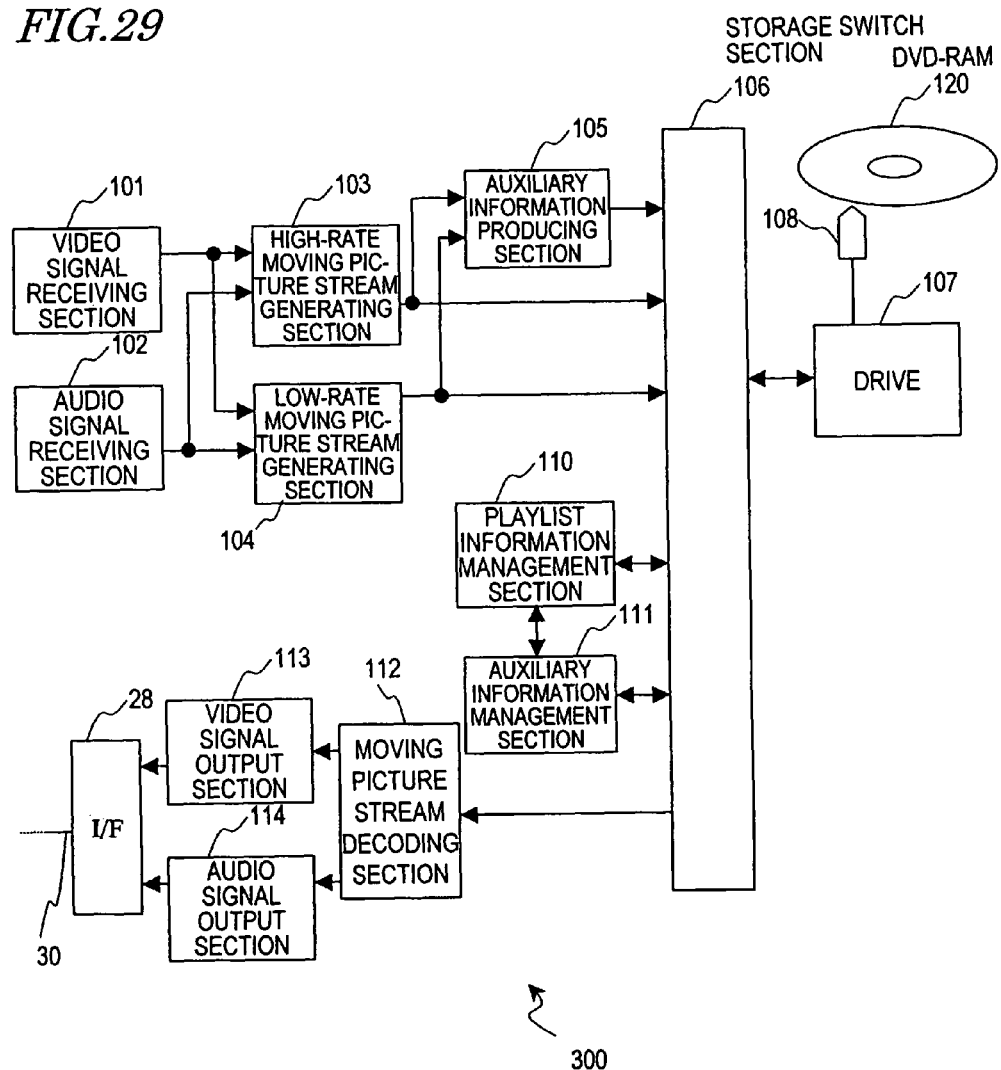

FIG. 29 is a block diagram of the camcorder 300.

BEST MODE FOR CARRYING OUT THE INVENTION

Hereinafter, preferred embodiments of a data processor according to the present invention will be described with reference to the accompanying drawings. In the following description, any pair of components identified by the same reference numeral is supposed to have similar functions and configurations.

Embodiment 1

Figure 3:
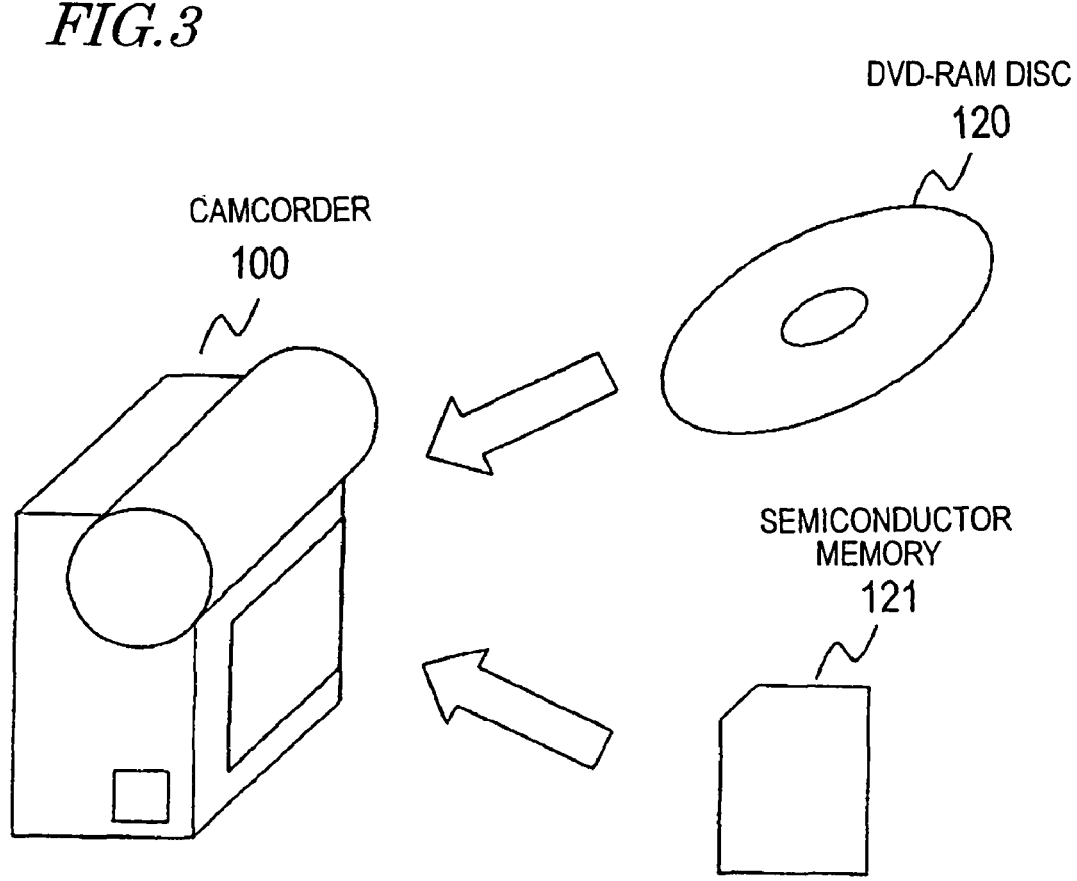
FIG. 3 shows a camcorder 100 as an exemplary data processor according to a first preferred embodiment.

FIG. 3 illustrates a camcorder 100 as an exemplary data processor according to this preferred embodiment. Just like a normal camcorder, the camcorder 100 also includes an image pickup section (including a lens, an image sensing device and so on) for acquiring a video signal representing video and a microphone for acquiring an audio signal representing audio. The camcorder 100 can store a moving picture stream, generated by encoding the video signal and/or the audio signal, on a storage medium.

The camcorder 100 of this preferred embodiment includes not only a DVD-RAM drive (corresponding to the drive 107 shown in FIG. 5 and described later) to be loaded with a DVD-RAM disc 120 (which will be referred to herein as an "optical disc") but also a semiconductor memory card slot (not shown) to be loaded with a semiconductor memory 121. The camcorder 100 can store the same video as two moving picture streams with different data rates on the optical disc 120 and on the semiconductor memory 121, respectively.

The moving picture stream stored on the optical disc 120 is supposed to be a moving picture stream having a relatively high data rate of about 10 Mbps (which will be referred to herein as a "high-rate moving picture stream"). On the other hand, the moving picture stream stored in the semiconductor memory 121 is supposed to be a moving picture stream having a relatively low data rate of about 1 Mbps (which will be referred to herein as a "low-rate moving picture stream"). It should be noted that 10 Mbps and 1 Mbps could be replaced with any other values. Thus, a data rate is regarded as relatively "high" or "low" by comparing the respective rates of two given moving picture streams with each other.

Hereinafter, the operations of the camcorder 100 and PC 201 of this preferred embodiment will be outlined with reference to FIGS. 4(*a*) and 4(*b*). The data processor is supposed herein to be a PC. However, this is just an exemplary data processor and a DVD recorder, a video editor or any other suitable apparatus may also be used as long as that apparatus has a "playlist" editing function to be described later.

FIGS. 4(*a*) and 4(*b*) show the procedures of processing done by the camcorder 100 and PC 201. First, referring to FIG. 4(*a*), the camcorder 100 stores a low-rate moving picture stream in the semiconductor memory 121 (this processing step will be identified herein by (1)). Meanwhile, the camcorder 100 also stores a high-rate moving picture stream on the optical disc 120 at the same time. Next, the user inserts the semiconductor memory 121 into the PC 201 (this processing step will be identified herein by (2)). The user instructs the PC 201 to play back the low-rate moving picture stream and complies a playlist of the video while monitoring the video. As used herein, the "playlist" defines the playback ranges of part or all of at least one moving picture stream. If there are a number of moving picture streams, then the playlist also defines moving picture streams to play back and their playback order. Subsequently, the PC 201 acquires the playlist that has been drawn up by the user, produces playlist information and writes the playlist information in the semiconductor memory 121 (this processing step will be identified herein by (3)). When the user loads that semiconductor memory 121 into the camcorder 100 (this processing step will be identified herein by (4)), the camcorder 100 produces playlist information for high-rate playback based on the playlist information stored in the semiconductor memory 121 and the high-rate moving picture stream stored on the optical disc 120, and then writes the playlist information on the optical disc 120 (this processing step will be identified herein by (5)).

In the processing shown in FIG. 4(a), the camcorder 100 automatically produces high-rate playlist information based on the low-rate playlist information that has been produced by the PC 201. Thus, the user no longer needs to produce high-rate playlist information by himself or herself.

Next, the processing done by the camcorder 100 and PC 201 will be described with reference to FIG. 4(b). First, the camcorder 100 stores a high-rate moving picture stream on the optical disc 120 (this processing step will be identified herein by (1)). Next, the user inserts the optical disc 120 into the PC 201 (this processing step will be identified herein by (2)). The user instructs the PC 201 to play back the high-rate moving picture stream and complies a playlist of the video while monitoring the video. Subsequently, the PC 201 acquires the playlist that has been drawn up by the user, produces playlist information and writes the playlist information on the optical disc 120 (this processing step will be identified herein by (3)). Then, the PC 201 generates a low-rate moving picture stream from the high-rate moving picture stream and stores the low-rate moving picture stream on the optical disc 120 (this processing step will be identified herein by (3)). Finally, the PC 201 produces playlist information for low-rate playback based on the high-rate moving picture stream, its playlist information, and the low-rate moving picture stream stored on the optical disc 120, and then writes the playlist information on the optical disc 120 (this processing step will be identified herein by (5)).

The user can get the playlist information produced by using the PC 201 that has high processing performance and operationality. In addition, the PC 201 also generates the low-rate moving picture stream and its playlist information, thus making it possible to get the processing done more easily and more efficiently. Furthermore, in the processing step (1), the camcorder 100 does not have to generate the low-rate moving picture stream. That is why compared with the processing described previously, the processing done by the camcorder 100 can be simplified and a slot to be loaded with the semiconductor memory 121 may be omitted, too. It should be noted that by loading the camcorder 100 with the optical disc 120, the low-rate moving picture stream can be played back in accordance with the low-rate playlist information.

Hereinafter, the configurations of the camcorder 100 and PC 201 will be described with reference to FIGS. 5 and 6. In the following description, the camcorder 100 and PC 201 are supposed to be able to do both of the processes shown in FIGS. 4(a) and 4(b). Depending on the contents of processing, however, some components thereof may be omitted. Thus, it should be noted that not all of those components are essential ones.

Figure 5:
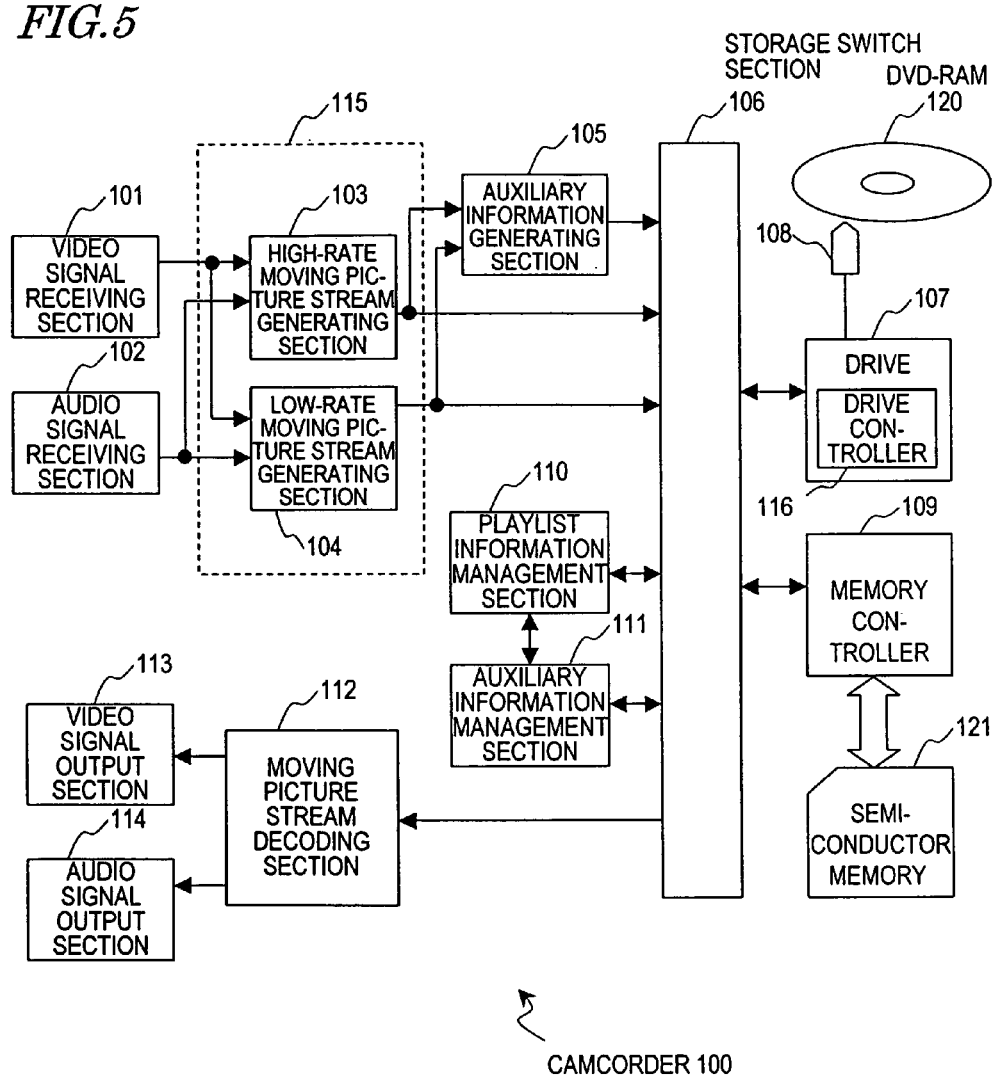
FIG. 5 is a block diagram of the camcorder 100.

FIG. 5 shows an arrangement of functional blocks in the camcorder 100. The camcorder 100 includes a video signal receiving section 101, an audio signal receiving section 102, an auxiliary information generating section 105, a storage switch section 106, a drive 107, a memory controller 109, a playlist information management section 110, an auxiliary information management section 111, a moving picture stream decoding section 112, a video signal output section 113, an audio signal output section 114, and a moving picture stream generating section 115.

The respective components of the camcorder 100 function as follows. The video signal receiving section 101 receives a video signal representing video from the output of a CCD (not shown) of a camera. The audio signal receiving section 102 receives an audio signal representing audio from a microphone (not shown, either).

The moving picture stream generating section 115 includes a high-rate moving picture stream generating section 103 and a low-rate moving picture stream generating section 104, which generate a high-rate moving picture stream and a low-rate moving picture stream, respectively. The encoding data rates differ according to encoding processes as defined by the encoding parameter or encoding method adopted, for example. The encoding process may be carried out so as to comply with the MPEG-2 standard, for example. However, detailed contents of the process are well known in the art and will not be described herein. It should be noted that the respective moving picture stream generating sections 103 and 104 may be implemented either as two physically separate circuits or as a single circuit to be used by a time division technique.

The auxiliary information generating section 105 generates auxiliary information on the moving picture streams. Examples of the auxiliary information includes access data required for reading component data of the moving picture stream, a time stamp representing a playback timing, an encoding bit rate, and codec information. The access data is a table defining a correlation between the playback duration of a moving picture stream and the storage addresses of the data to be read during that duration. The access data is referred to in playing back a moving picture stream either from the beginning or from a halfway point thereof or making a special playback of that stream. The storage switch section 106 switches data transmission paths.

The drive 107 reads and writes data from/on the optical disc 120. The drive 107 includes an optical pickup 108 and a drive controller 116. The optical pickup 108 emits a laser beam toward the optical disc 120, detects its reflected beam, and thereby outputs a read signal. The drive controller 116 is a central processing unit (CPU) for controlling the operation of the drive 107. Although not shown, the drive 107 further includes other known components such as a driver circuit for the optical pickup 108 and a spindle motor for spinning the optical disc. On the other hand, the memory controller 109 controls reading and writing of data from/on the semiconductor memory 121.

The playlist information management section 110 acquires playlist information from the semiconductor memory 121 or optical disc 120 and retains it. The playlist information management section 110 also acquires and retains playlist information that has been defined by the user by pressing buttons of the camcorder 110, for example. The auxiliary information management section 111 either manages the auxiliary information generated by the auxiliary information generating section 105 or reads out the auxiliary information from the storage medium and retains it.

The moving picture stream decoding section 112 (which will be simply referred to herein as "decoding section 112") decodes the moving picture stream, thereby extracting a video signal and an audio signal. The video signal output section 113 and audio signal output section 114 may be either terminals or output devices (e.g., display and loudspeaker) for outputting the video signal and the audio signal, respectively.

Hereinafter, the read and write operations of the camcorder 100 will be described as its basic operations. The operation of the camcorder 100 to be done with respect to the PC 201 as shown in FIG. 4 will be described later.

First, it will be described how the camcorder 100 stores the moving picture streams. In the following description, the camcorder 100 is supposed to store both the high-rate and low-rate moving picture streams alike. However, the camcorder 100 may store just one of these two moving picture streams. When the video signal receiving section 101 and audio signal receiving section 102 receive a video signal and an audio signal, respectively, the moving picture stream generating sections 103 and 104 convert these signals into a high-rate moving picture stream and a low-rate moving picture stream including MPEG video streams, for example. The high-rate moving picture stream generated is sent to the drive 107 by way of the storage switch 106. In response, the drive 107 obtains the moving picture stream stored on the DVD-RAM disc 120 by the optical pickup 108. On the other hand, the low-rate moving picture stream is sent to the memory controller 109 by way of the storage switch 106. In response, the memory controller 109 stores the moving picture stream on the semiconductor memory 121.

Next, it will be described how the camcorder 100 plays back the moving picture streams. A situation where the moving picture stream is stored on the optical disc 120 and a situation where the moving picture stream is stored on the semiconductor memory 121 will be described separately.

First, if the user requests to play back a moving picture stream stored on the optical disc 120, the drive controller 116 locates the moving picture stream on the optical disc 120 by either the auxiliary information managed by the auxiliary information management section 111 or the auxiliary information stored on the optical disc 120. Then, the drive controller 116 gets the moving picture stream read out by the pickup 108 and then transmits it to the decoding section 112 by way of the storage switch section 106. In response, the decoding section 112 decodes the moving picture stream, splits it into a video signal and an audio signal and then outputs them. The video signal output section 113 and the audio signal output section 114 output the video signal and audio signal, respectively.

On the other hand, if the user requests to play back a moving picture stream stored in the semiconductor memory 121, the memory controller 109 locates the moving picture stream in the semiconductor memory 121 by either the auxiliary information managed by the auxiliary information management section 111 or the auxiliary information stored in the semiconductor memory 121. Then, the memory controller 109 reads the moving picture stream from the semiconductor memory 121 and then transmits it to the decoding section 112 by way of the storage switch section 106. After that, the same processing steps are carried out as in reading a moving picture stream from the optical disc 120.

If playlist information is stored on the storage medium, then the drive controller 116 of the drive 107 acquires the playlist information from the optical disc 120, while the memory controller 109 acquires the playlist information from the semiconductor memory 121. The playlist information is transmitted to the playlist information management section 110 by way of the storage switch section 106. In response, the playlist information management section 110 retains the playlist information. When a moving picture stream is played back in accordance with playlist information, the playlist information retained in the playlist information management section 110 and the auxiliary information retained in the auxiliary information management section 111 are used.

Next, the configuration of the PC 201 will be described with reference to FIG. 6, which shows an arrangement of functional blocks in the PC 201. The PC 201 includes a commanding section 130, a controller 131, a high-rate moving picture stream generating section 133, a low-rate moving picture stream generating section 134, an auxiliary information generating section 135, a storage switch section 136, a drive 137, an optical pickup 138, a memory controller 139, a playlist information management section 140, an auxiliary information management section 141, a moving picture stream decoding section 142, a video signal output section 143, and an audio signal output section 144.

Among the respective components of the PC 201, any component having the same function as the counterpart of the camcorder 100 is given the same name. Thus, those components will not be described again one by one but specific functions and operations of the PC 201 will be described.

The commanding section 130 is an input device such as a keyboard or a mouse to receive various commands from the user. The user may enter a command to make a playlist or to convert a moving picture stream through the commanding section 130. The controller 131 receives the user's commands and instructs processing to be done to execute the commands. For example, the controller 131 may be implemented as part of the functions of the central processing unit (CPU; not shown) of the PC 201. The controller 131 produces playlist information on receiving a command to draw up a playlist and instructs the moving picture stream generating section to convert the rate of the moving picture stream on receiving a command to convert the moving picture stream.

Figure 7:
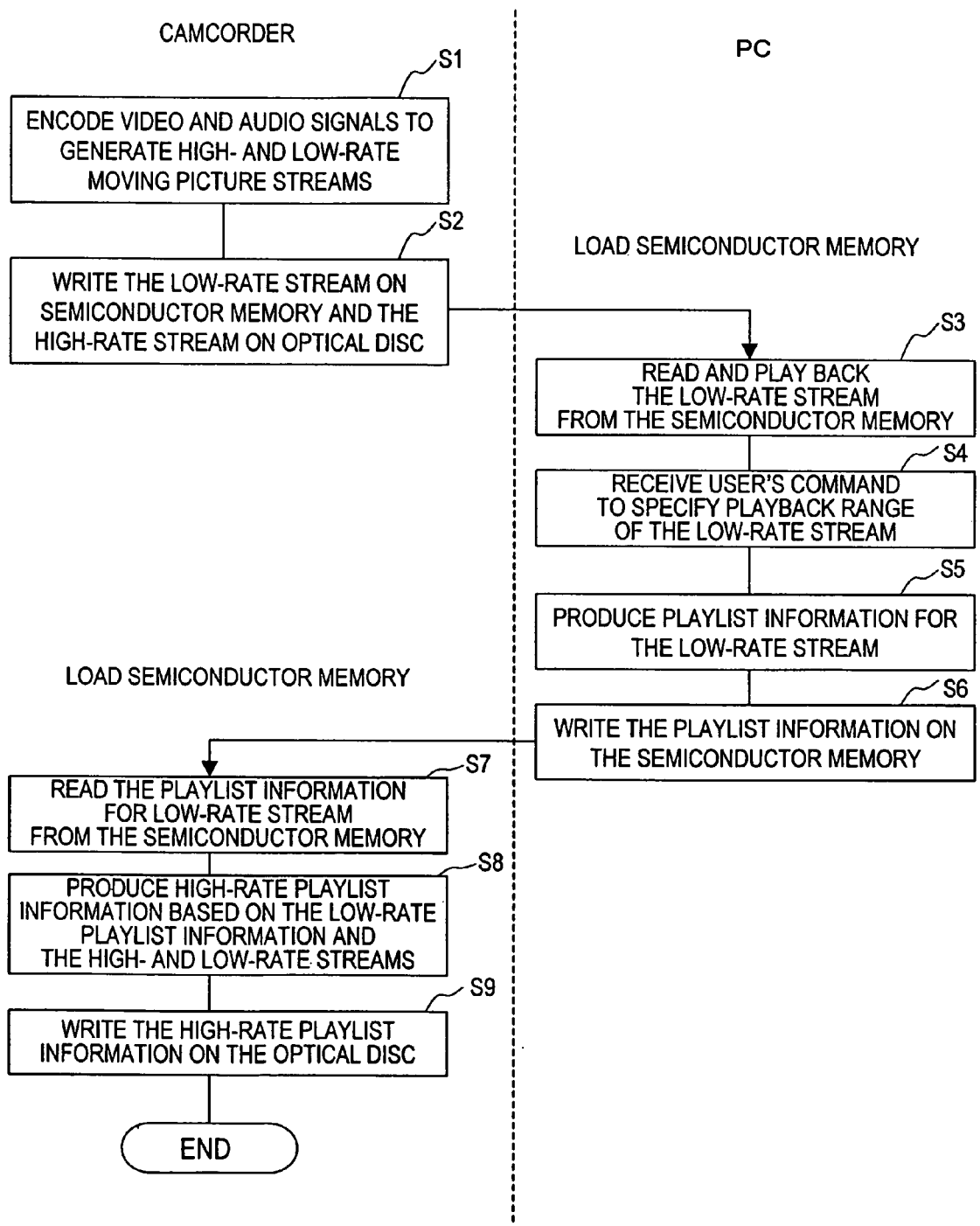
FIG. 7 is a flowchart showing the flow of processing to be carried out by the camcorder 100 and the PC 201.

Hereinafter, the first type of processing of this preferred embodiment, already described briefly with reference to FIG. 4(a), will be described more fully. FIG. 7 shows the flow of the first type of processing to be carried out by the camcorder 100 and the PC 201. In FIG. 7, the processing steps to be done by the camcorder 100 are shown on the left-hand side, while those to be done by the PC 201 on the right-hand side. First, in Step S1, the moving picture stream generating section 115 of the camcorder 100 generates a high-rate moving picture stream and a low-rate moving picture stream by encoding a video signal and an audio signal. Next, in Step S2, the memory controller 109 writes the low-rate moving picture stream in the semiconductor memory 121, while the drive controller 116 writes the high-rate moving picture stream on the optical disc 120.

The user removes the semiconductor memory 121 from the camcorder 100 and then loads it into the PC 201. Then, in Step S3, the PC 201 reads out the low-rate moving picture stream from the semiconductor memory and plays it back on the monitor of the PC 201. The user can start compiling a playlist while monitoring the video being presented. That is why compared with making a playlist with the camcorder 100 or any other apparatus equipped with only limited input means, the user can make it more comfortably.

Next, in Step S4, the commanding section 130 receives a user's command on his or her desired playback range of the low-rate moving picture stream.

Figure 1:
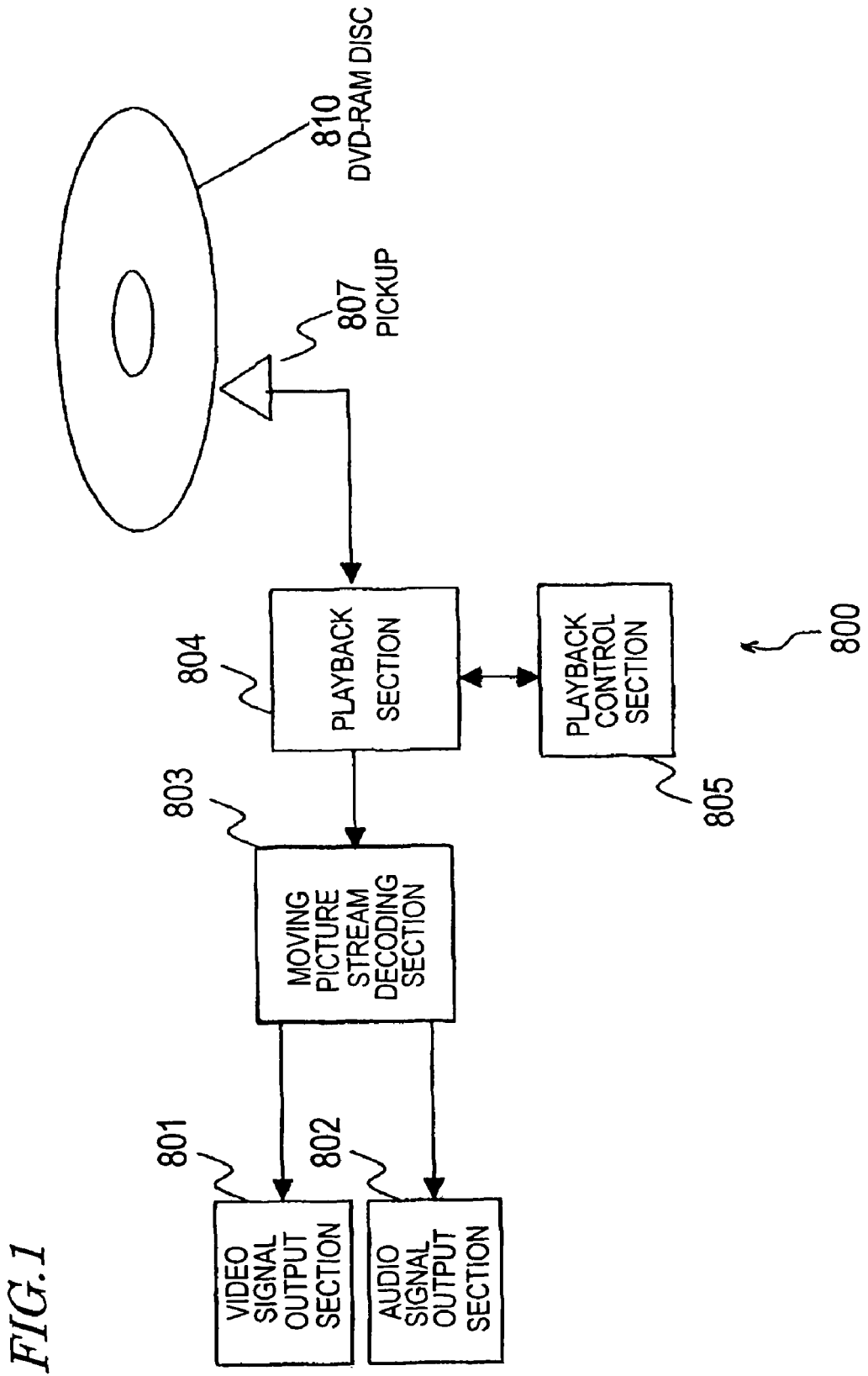
FIG. 1 is a block diagram of a conventional player 800.
Figure 2:
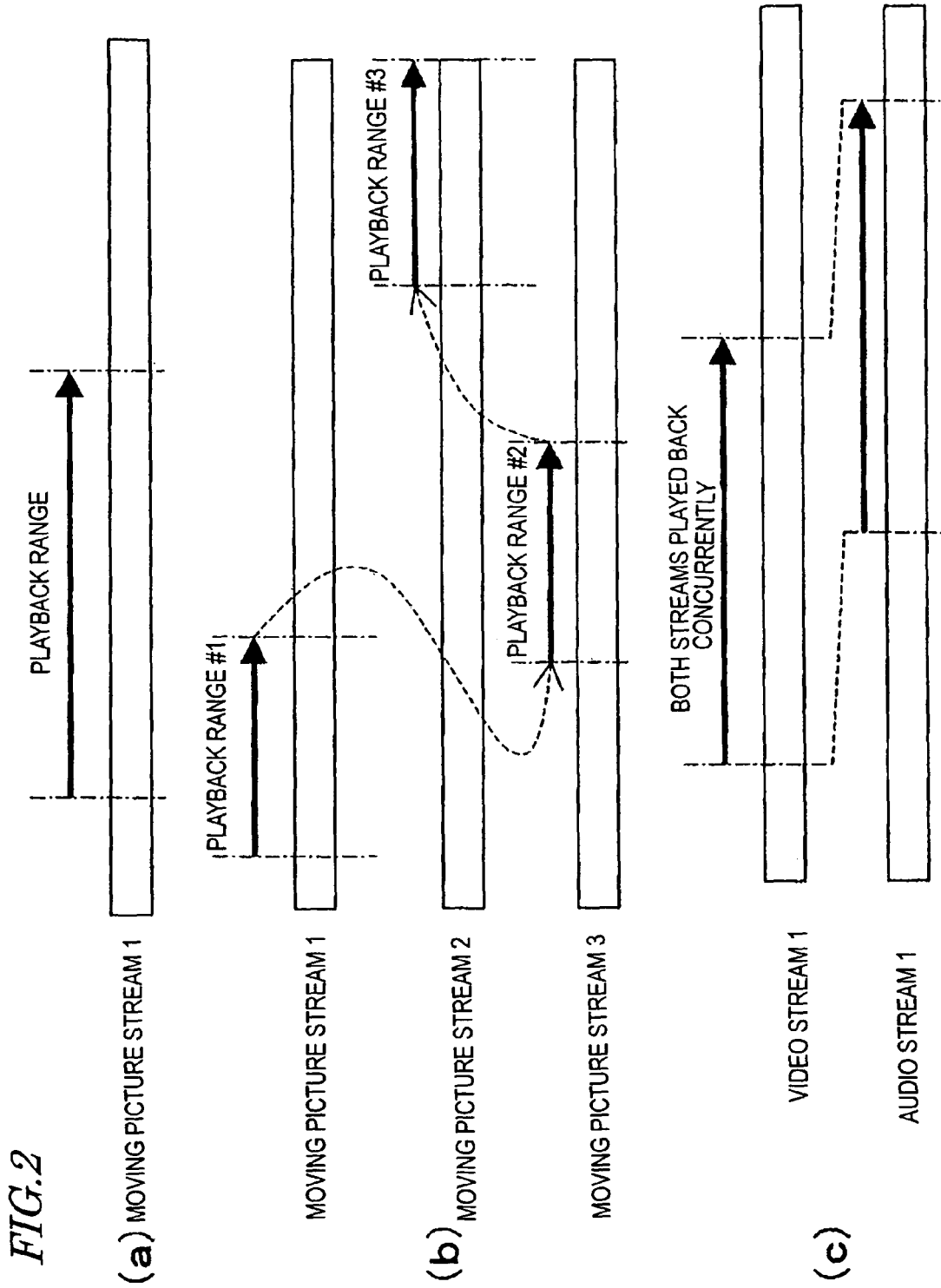
FIGS. 2(*a*) through 2(*c*) show exemplary playback orders as defined by playlist information.

It should be noted that this statement applies to a situation where a playlist is being made on only a single stream as shown in FIG. 2(a), for example. In making a playlist on a plurality of streams as shown in FIG. 2(b), however, the commanding section 130 receives not only commands to specify playback ranges of the respective streams but also a command to specify the playback order of those streams. Furthermore, the commanding section 130 may also receive commands to specify playback ranges and playback orders for both the video and audio streams as shown in FIG. 2(c).

Subsequently, the controller 131 produces playlist information to execute the user's command in Step S5, and then stores the playlist information in the semiconductor memory 121 in Step S6. This playlist information defines a playlist with respect to the low-rate moving picture stream being played back currently. Thereafter, the semiconductor memory 121 is removed and inserted into the camcorder 100 again.

Figure 8:
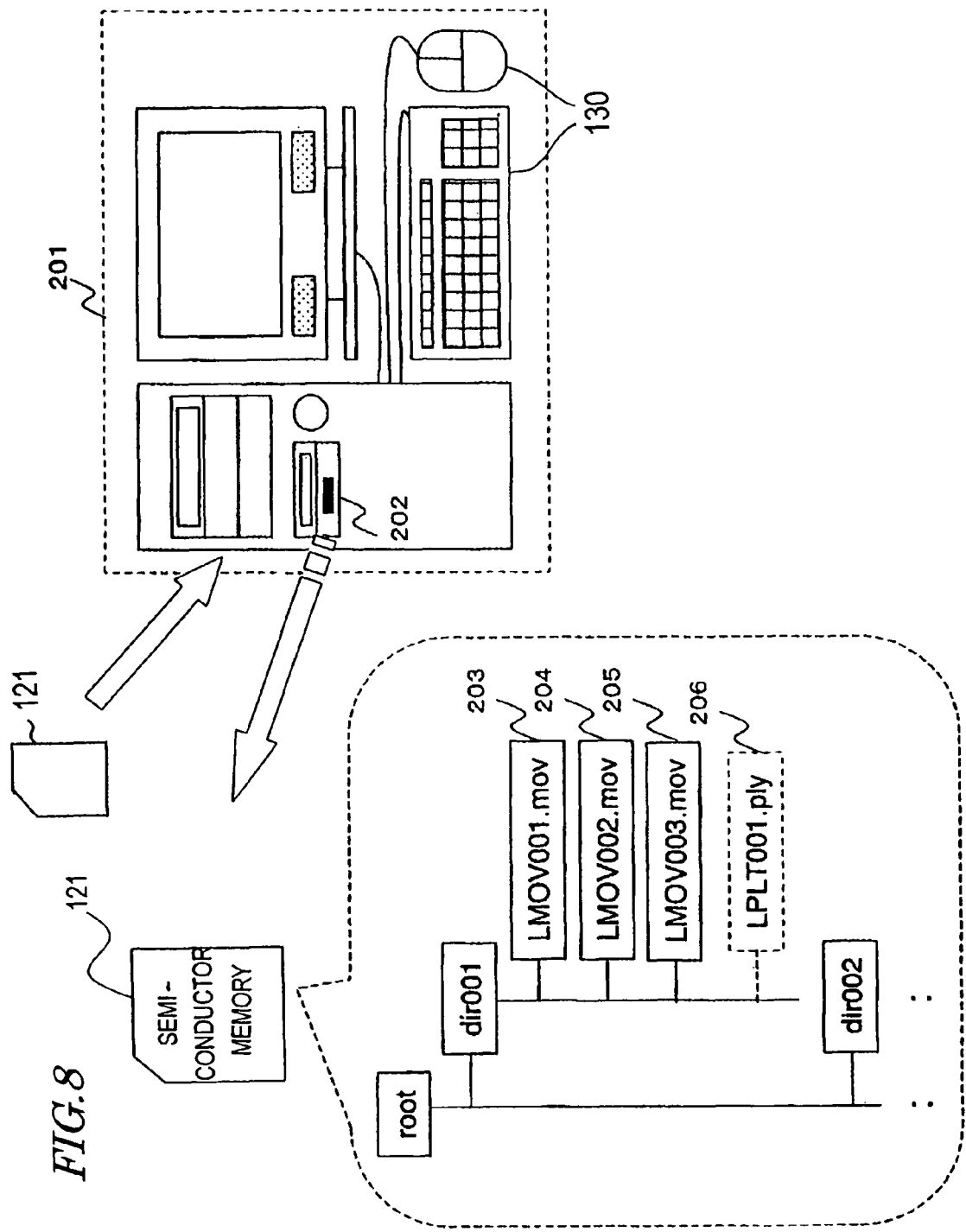
FIG. 8 shows a semiconductor memory 121, which was inserted into a semiconductor memory slot 202 of the PC 201, processed, and has just been removed.

FIG. 8 shows the semiconductor memory 121, which was inserted into the semiconductor memory slot 202 of the PC 201, processed, and then has just been removed. FIG. 8 also shows an exemplary file structure of the semiconductor memory 121 that has been removed from the PC 201. In FIG. 8, the directory "dir001" stores the data files 203, 204, and 205 of three low-rate moving picture streams (which will be referred to herein as "low-rate moving picture files") and a playlist information file 206 to manage the playback of those moving picture streams. The low-rate moving picture files 203, 204 and 205 were saved by the camcorder 100, while the playlist information file 206 was saved by the PC 201.

Figure 9:
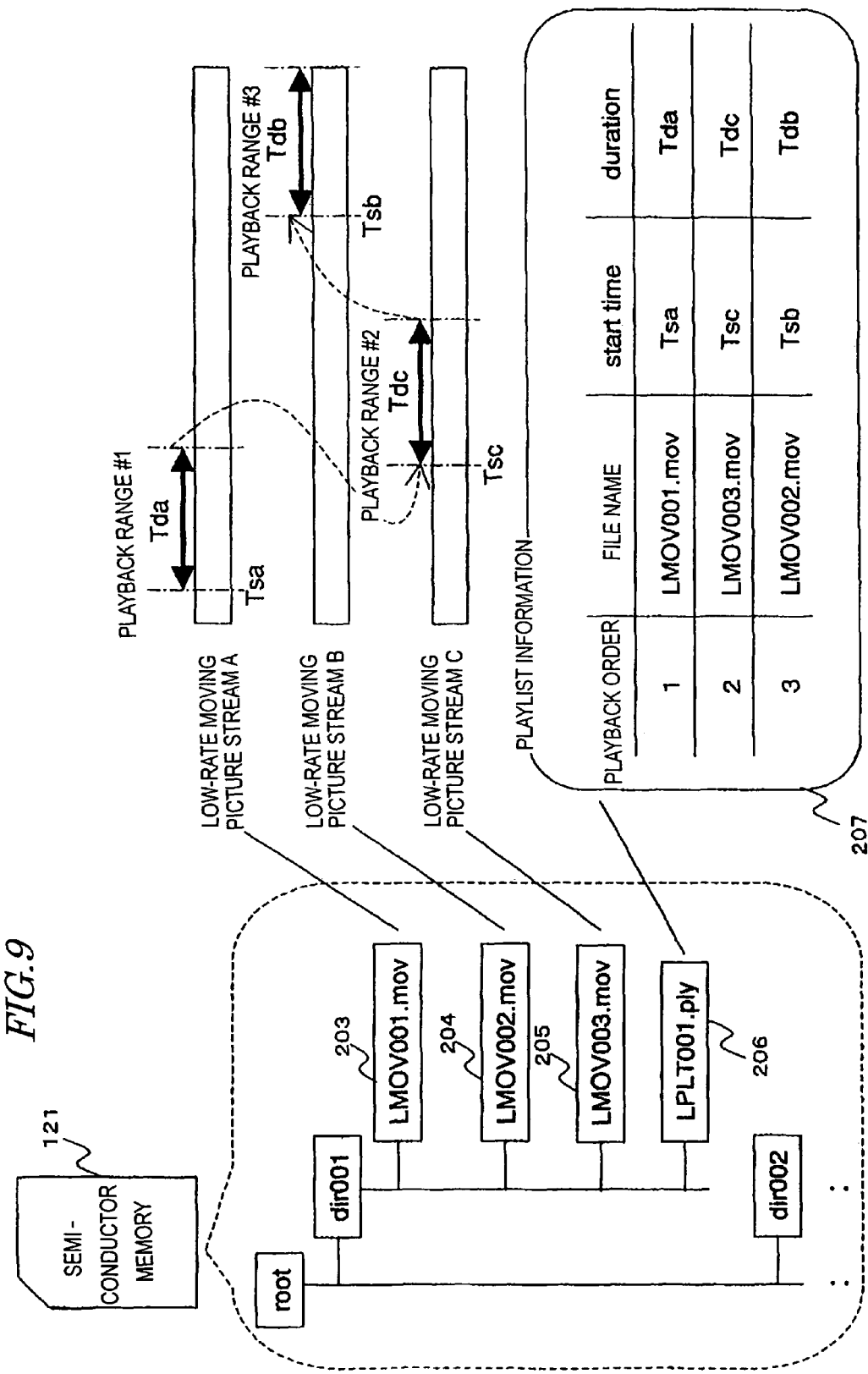
FIG. 9 shows a correlation between low-rate moving picture streams A to C and playlist information 207.

The playlist information file 206 contains the playback locations (i.e., playback times) and the playback order of the low-rate moving picture streams that are stored in the low rate moving picture files 203 to 205. FIG. 9 shows a correlation between the low-rate moving picture streams A to C and the playlist information 207. The streams A through C correspond to the streams stored in the low-rate moving picture files 203 to 205, respectively. The low-rate moving picture files 203 to 205 contain not only the low-rate moving picture streams A through C but also auxiliary information including access data associated with those streams stored.

Figure 10:
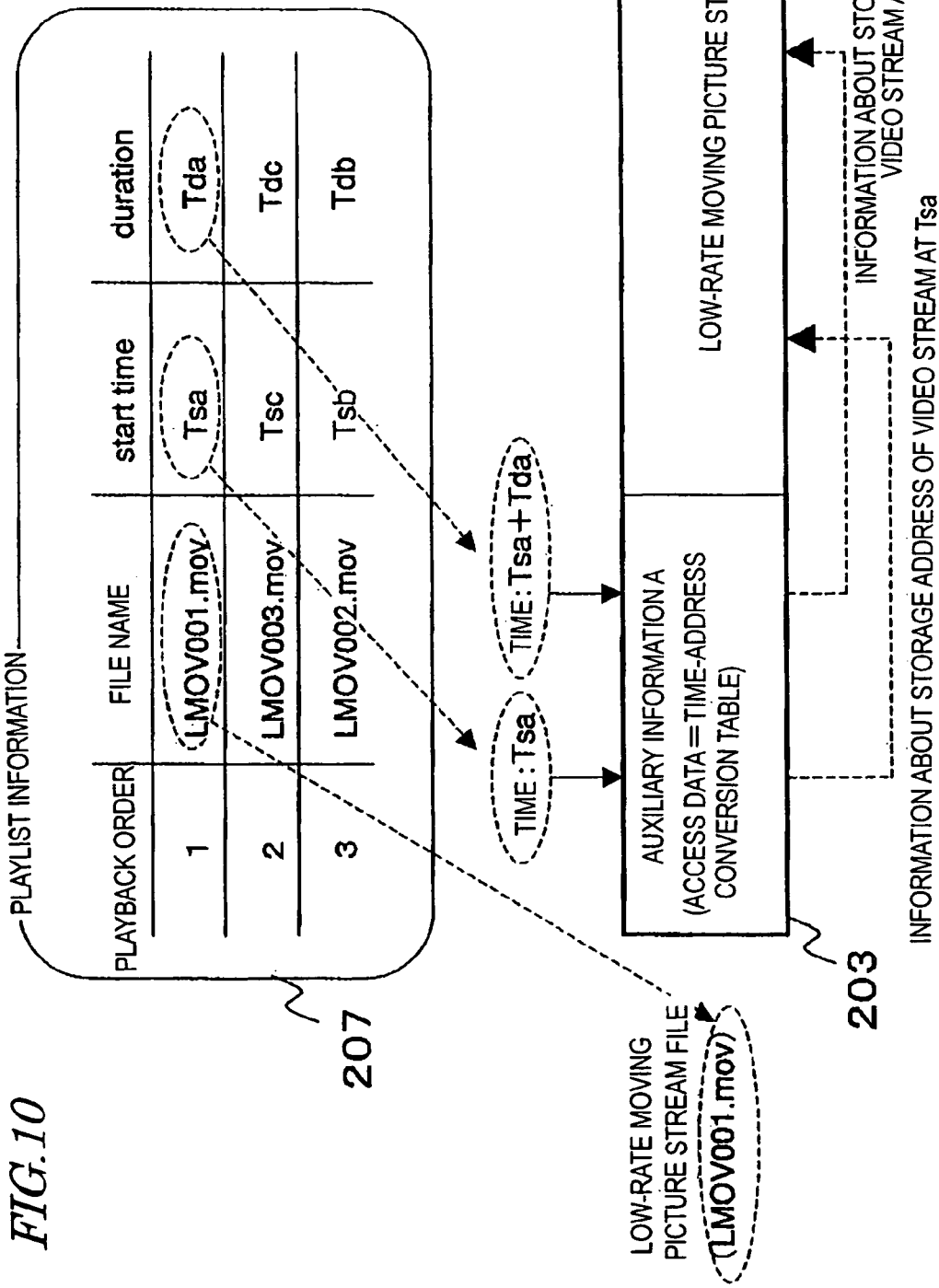
FIG. 10 shows a correlation between the contents of the playlist information 207 and playback locations of a low-rate moving picture stream.

In the playlist information 207, not just the playback order but also the names of the files storing the moving picture streams, the times to start playing back the moving picture streams (i.e., "start time") and the durations for which those streams should be played back continuously (i.e., "duration") are described. A player such as the camcorder 100 and the PC 201 may use the file names as information to identify streams. By reference to those pieces of information and the access data in the auxiliary information stored in the respective files, playlist playback is realized. FIG. 10 shows a correlation between the contents of the playlist information 207 and playback locations of a low-rate moving picture stream. In the following description, the low-rate moving picture stream A (with a file name "LMOV001.mov") to be played back first will be taken as an example. First, by the playback start time Tsa and playback duration Tda in the playlist information 207, the start time Tsa and end time Tsa+Tda are fixed. Then, the access data defined by the auxiliary information A in the file is referred to next. The access data is a table defining correlations between the times and the storage addresses of the data to read at those times. As a result, the address information of the low-rate moving picture stream, associated with the fixed start time Tsa and end time Tsa+Tda, can be obtained. Consequently, a particular range of the moving picture stream A is played back as defined by the playlist information 207. The playback range is specified and played back in a similar manner as to the second and third moving picture streams to play.

Next, it will be described with reference to FIG. 7 how the camcorder 100, reloaded with the semiconductor memory 121, carries out its processing. In Step S7, the memory controller 109 of the camcorder 100 reads the playlist information file 206 of a low-rate moving picture stream from the semiconductor memory 121 and transmits it to the playlist information management section 110. In response, the playlist information management section 110 analyzes the playlist information file 206, thereby identifying the low-rate moving picture file defined by the playlist information 207 and detecting its playback order, locations and duration.

Next, if the camcorder 100 senses that a file containing a high-rate moving picture stream (which will be referred to herein as a "high-rate moving picture file"), corresponding to the low-rate moving picture file, is stored on the DVD-RAM disc 120, the camcorder 100 carries out Step S8.

As used herein, if a high-rate moving picture file "corresponds to" a low-rate moving picture file, then the file name of the high-rate moving picture file is associated with that of the low-rate moving picture file under a certain rule. For example, a rule may be laid down such that when the low-rate moving picture file has a file name "LMOV001.mov", the high-rate moving picture file should have a file name "HMOV001.mov" by replacing the first letter L with H. Alternatively, another rule may be set down such that when the low-rate moving picture file has a file name "MOVE001.mvl", the high-rate moving picture file should have a file name "MOVE001.mvh" by replacing the last letter l of the extension with h.

Optionally, the correspondence between the low-rate and high-rate moving picture files may also be pointed out by the recording time stamps of the streams, for example. More specifically, the information about the stream generation dates and times may be contained in either the respective moving picture streams or their associated auxiliary information. In that case, if two streams are written at the same time, then the generation time stamps thereof will be identical and those streams can be associated with each other as two moving picture files representing the same video. Information to manage the stream correspondence may be saved as a file on the storage medium.

Next, in Step S8, the playlist information management section 110 produces high-rate playlist information based on the low-rate playlist information 207 and the high-rate and low-rate moving picture streams. Then, in Step S9, the drive 107 writes the playlist information for the high-rate moving picture stream on the optical disc.

Figure 11:
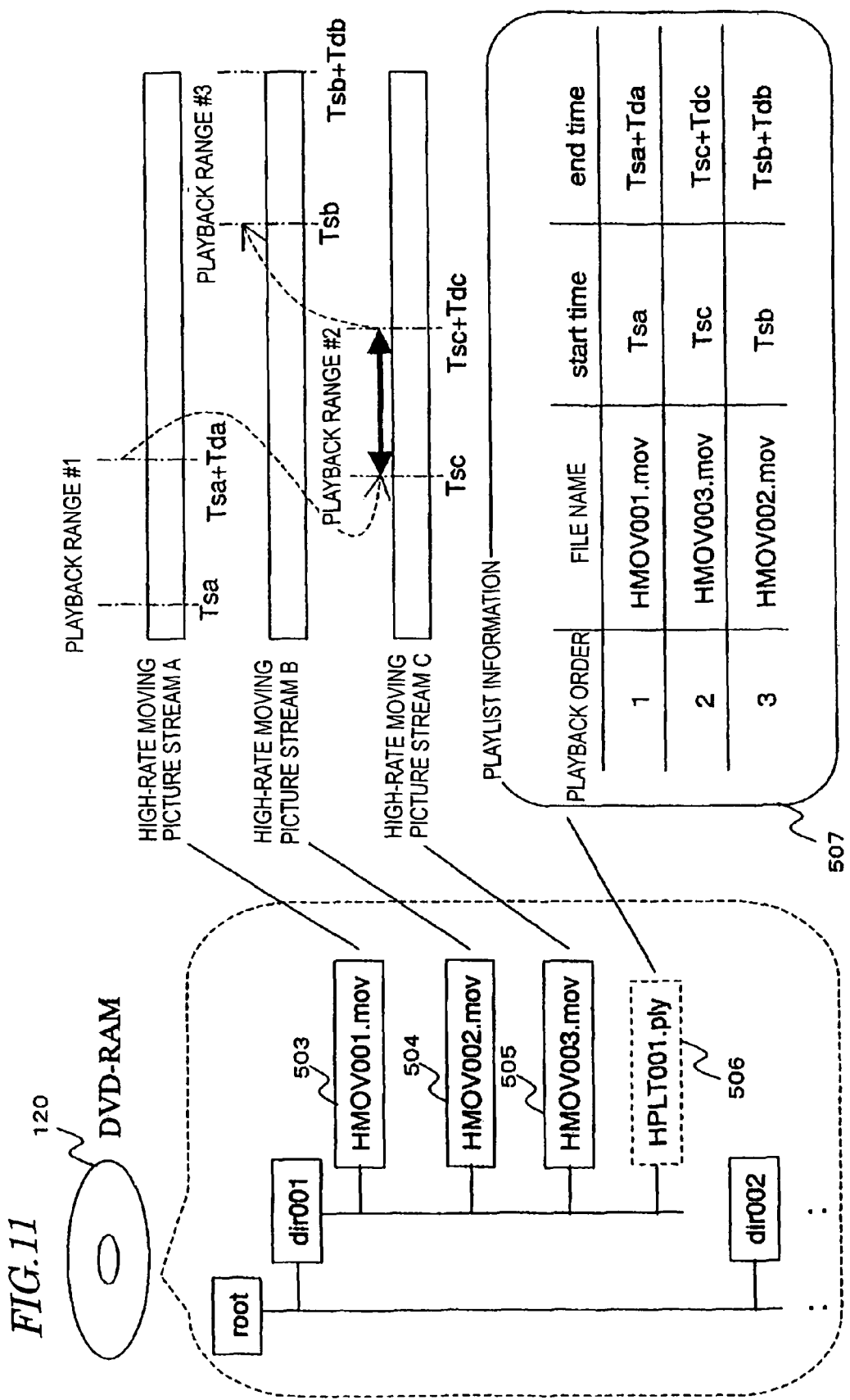
FIG. 11 shows a correlation between high-rate moving picture streams A to C and playlist information 507 for high-rate playback.

FIG. 11 shows a correlation between high-rate moving picture streams A to C and high-rate playlist information 507. The high-rate moving picture streams A to C are stored in the high-rate moving picture files 503 to 505, respectively. The playlist information 507 stored in the playlist information file 506 defines the playback locations (or playback times) and playback order of the high-rate moving picture streams A to C stored in the high-rate moving picture files 503 to 505.

As can be clearly seen by comparing FIGS. 11 and 9, the playlist information management section 110 sets the names of the reference files as those of high-rate moving picture files and defines the playback ranges of the high-rate moving picture streams by the playback start times and end times. The low-rate playlist information 207 defines playback durations, while the high-rate playlist information 507 defines the ranges by playback end times. However, this is just an example in which the playback range can be defined arbitrarily. Thus, this conversion is not always necessary.

Even in this high-rate playlist information 507, if the playback range is defined by the playback start time and playback duration, then the definitions for the low-rate playlist information 207 may be used as they are. This is because any pair of high-rate and low-rate moving picture streams corresponding to each other should have the same frame or field to play back and present at a particular point in time as a matter of principle. In that case, the playback locations (i.e., playback times) and playback order of high-rate moving picture streams as defined by the high-rate playlist information 507 should be the same as those of their corresponding low-rate moving picture streams, no matter what method is adopted.

As described above, the camcorder 100 of this preferred embodiment can produce the playlist information 507 for high-rate moving picture streams based on the playlist information 207 for low-rate moving picture streams, which has been produced by the external unit (i.e., the PC 201).

According to the processing method of this preferred embodiment, after some streams have been obtained with a camcorder, that troublesome editing work of those streams may be carried out with a PC, thereby automatically producing playlist information for high-rate moving picture streams from the playlist information for completed low-rate moving picture streams. Thus, a playlist for those high-rate moving picture streams can be compiled without performing any complicated input work on the camcorder to make the playlist.

In addition, if the low-rate moving picture stream data is used to make the playlist on the PC 201, then the amount of data required can be cut down as described above. That is why the semiconductor memory 121, which usually has a smaller data storage capacity than the optical disc 120, can be used. As a result, the storage medium can be carried even more easily. Furthermore, since the moving picture stream includes a smaller amount of data, the processing load on the PC 201 can be reduced, too. Consequently, compared with a situation where the same work is carried out on high-rate moving picture streams, the expected response of the equipment should be faster.

Figure 12:
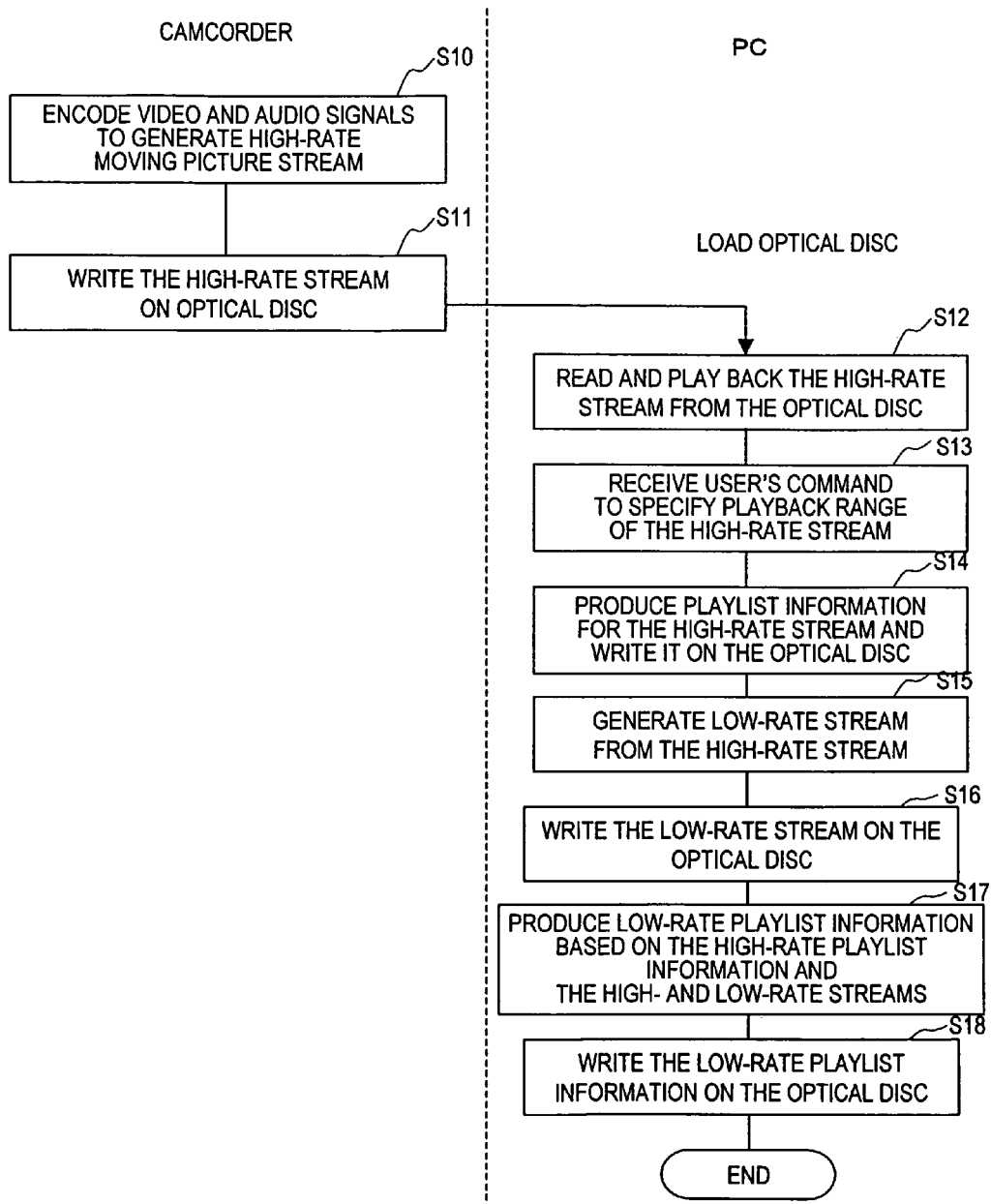
FIG. 12 is a flowchart showing the flow of processing to be carried out by the camcorder 100 and the PC 201.

Hereinafter, the second type of processing of this preferred embodiment, already described briefly with reference to FIG. 4(b), will be described more fully. FIG. 12 shows the flow of the second type of processing to be carried out by the camcorder 100 and the PC 201. In FIG. 12, the processing steps to be done by the camcorder 100 are shown on the left-hand side, while those to be done by the PC 201 on the right-hand side. First, in Step S10, the moving picture stream generating section 115 of the camcorder 100 generates a high-rate moving picture stream by encoding a video signal and an audio signal. Next, in Step S11, the drive controller 116 writes the high-rate moving picture stream on the optical disc 120.

The user removes the optical disc 120 from the camcorder 100 and then loads it into the drive 137 of the PC 201. Then, in Step S12, the PC 201 reads out the high-rate moving picture stream from the optical disc 120 and plays it back on the monitor of the PC 201. The user can start compiling a playlist while monitoring the video being presented.

Next, in Step S13, the commanding section 130 receives user's commands on his or her desired playback ranges, playback order and so on of the high-rate moving picture streams. Then, in the next step S14, the controller 131 produces the high-rate playlist information 507 shown in FIG. 11, for example, and writes it on the optical disc 120 to carry out those commands.

In Step S15, the low-rate moving picture stream generating section 134 generates a low-rate moving picture stream based on the high-rate moving picture stream. This processing step may be done by making the low-rate moving picture stream generating section 134 receive the video signal and audio signal, which have been decoded by the moving picture stream decoding section 142, and encode those signals at a lower data rate. Meanwhile, the auxiliary information generating section 135 generates auxiliary information including the access data of the low-rate moving picture stream.

Next, in Step S16, the drive controller 132 writes the low-rate moving picture stream and auxiliary information generated as a low-rate moving picture file on the optical disc 120. As a result, the low-rate moving picture files 203 to 205 shown in FIG. 9 are provided on the optical disc 120.

Subsequently, in Step S17, the playlist information management section 140 of the PC 201 produces the low-rate playlist information 207 shown in FIG. 9, for example, based on the high-rate playlist information 507 and high-rate and low-rate moving picture streams. In the high-rate playlist information 507 and low-rate playlist information 207, the differences in parameters defining their playback ranges are just examples as described above. Thus, their playback ranges may be either the same or defined by any other method.

Thereafter, in Step S18, the drive controller 132 writes the low-rate playlist information on the optical disc 120. As a result, the high- and low-rate moving picture stream files and the playlist information files associated with the respective streams are stored on the optical disc 120. More specifically, not only the high-rate moving picture files 503 through 505 and their playlist information file 506 saved in the directory "dir001" shown in FIG. 11 but also the low-rate moving picture files 203 through 205 and their playlist information file 206 saved in the directory "dir001" shown in FIG. 9 are stored on the optical disc 120. Since all of these files are stored on the same optical disc 120, the latter directory may be renamed as "dir002", for example.

If the processing steps shown in FIG. 12 are carried out, the user can obtain moving picture streams that have been encoded in different manners (e.g., at different encoding rates) and their associated playlist information just by getting a single moving picture stream written on the optical disc 120 by the camcorder 100 and making a playlist for that moving picture stream. Accordingly, compared with a situation where playlist information needs to be produced for each of those moving picture streams, handiness increases significantly. By reloading this optical disc 120 into the camcorder 100, the camcorder 100 can make a playlist playback of the low-rate moving picture stream.

Embodiment 2

A data processor for generating a moving picture stream with a different data structure from the foregoing example and producing playlist information will be described as a second preferred embodiment of the present invention. In this preferred embodiment, an MP4 file format as defined by the MPEG-4 system standard (ISO/IEC 14496-1) will be described as an example. The MP4 file format is defined based on the QuickTime™ file format of Apple Corporation, and is a promising format because it is currently supported by various PC applications and is highly compatible with a PC.

Figure 6:
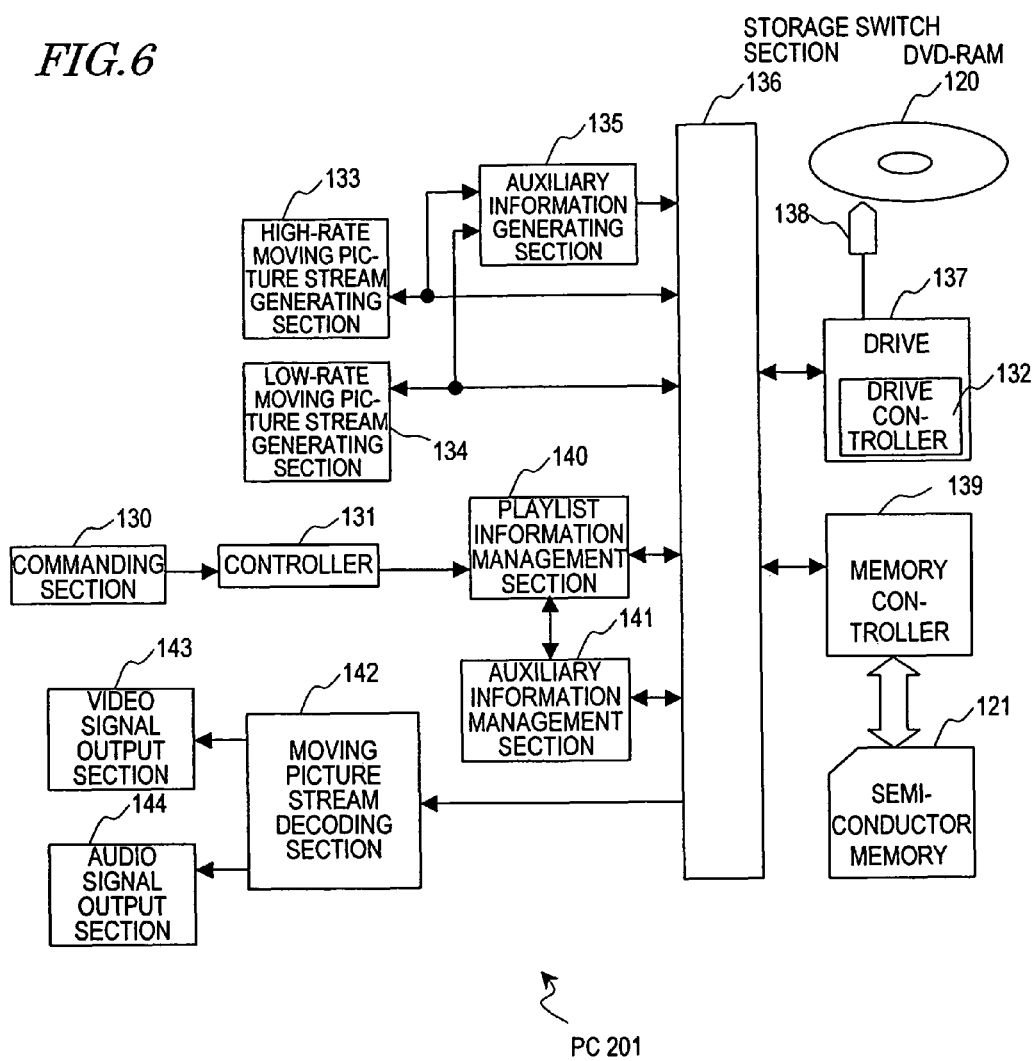
FIG. 6 is a functional block diagram of the PC 201.

A data processor according to this preferred embodiment has the same functions and configuration as those of the camcorder 100 shown in FIG. 5 and the PC 201 shown in FIG. 6, and the description thereof will be omitted herein.

First, the file structure of an MP4 file will be described with reference to FIGS. 13 to 16 sequentially. After that, it will be described how it is applied to the processing of the present invention.

Figure 13:
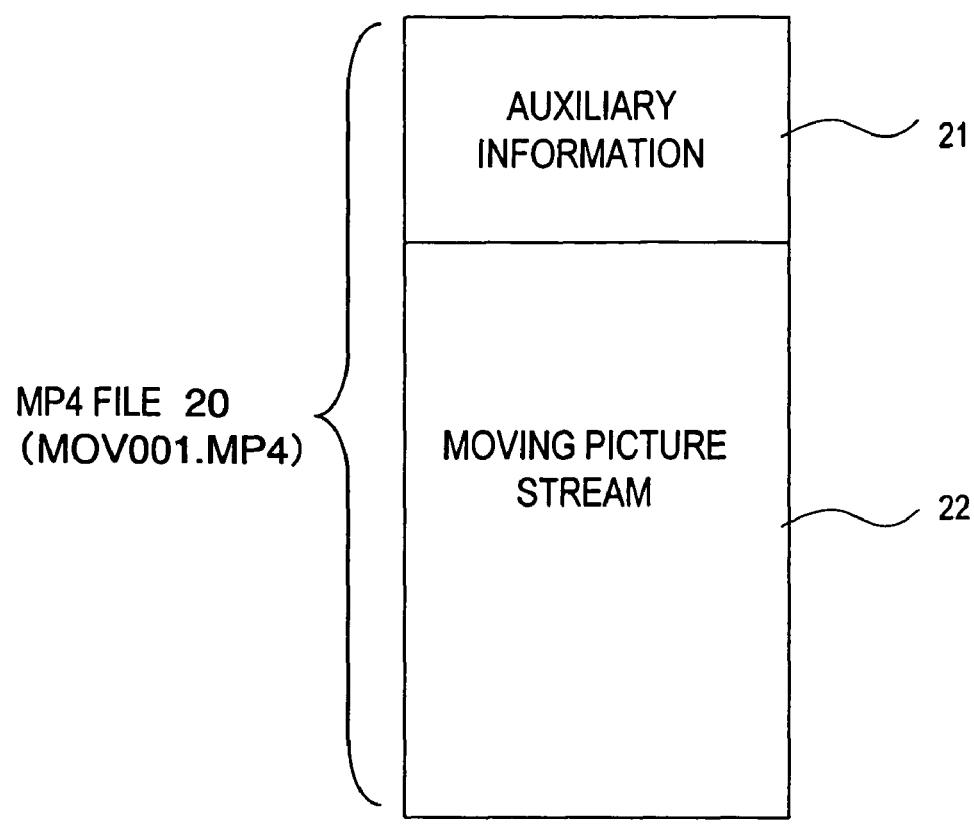
FIG. 13 shows the data structure of an MP4 file 20.

FIG. 13 shows the structure of an MP4 file 20. The MP4 file 20 includes auxiliary information 21 and a moving picture stream 22. The MPEG4 system standard (ISO/IEC 14496-1) defines the data structure of a system stream 22 including MPEG2 video or MPEG4 video (i.e., a moving picture stream) and its auxiliary information 21 as shown in FIG. 13. The auxiliary information 21 includes frame-by-frame data sizes, data storage addresses and frame playback durations as access data for video and audio. In the moving picture stream 22, video data and audio data are arranged on the basis of at least one frame.

Figure 14:
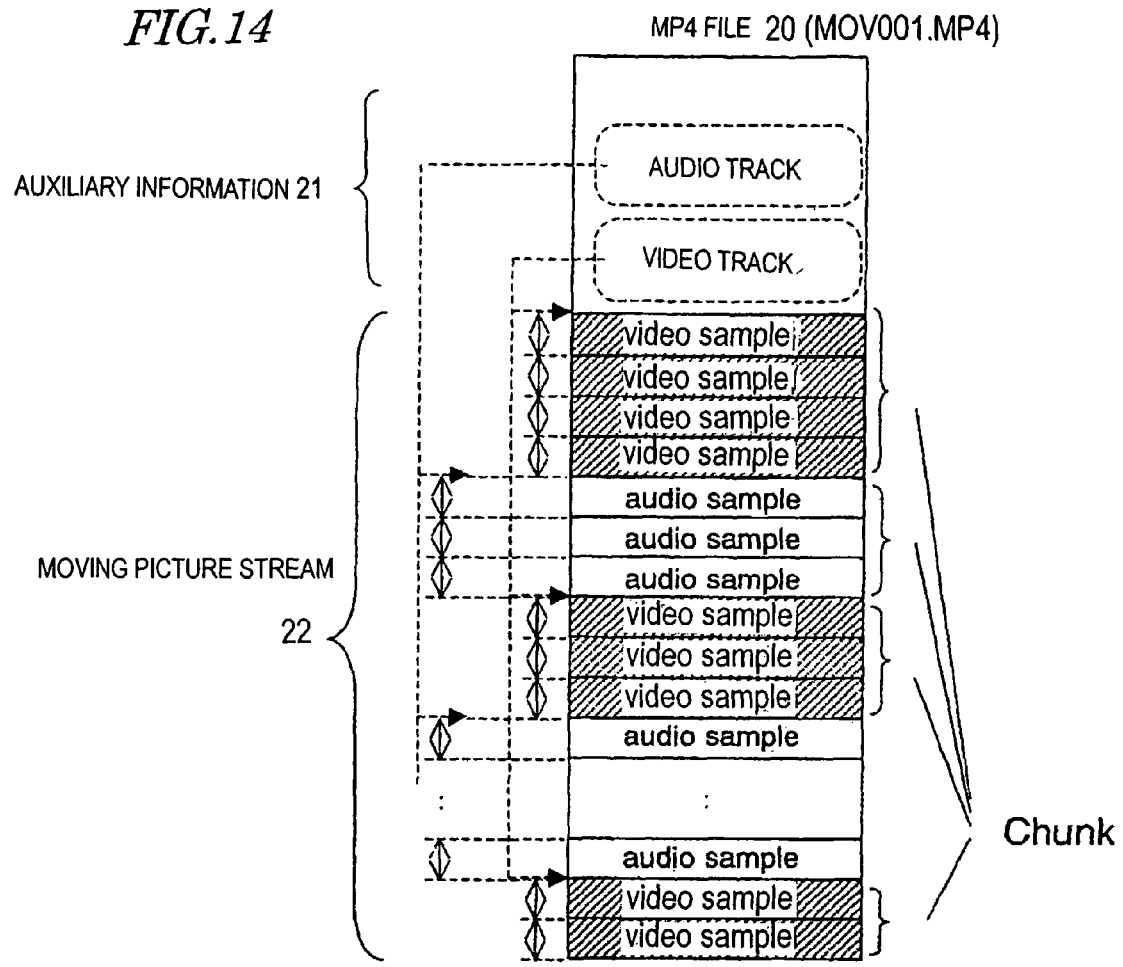
FIG. 14 shows a specific format for the MP4 file 20.
Figure 15:
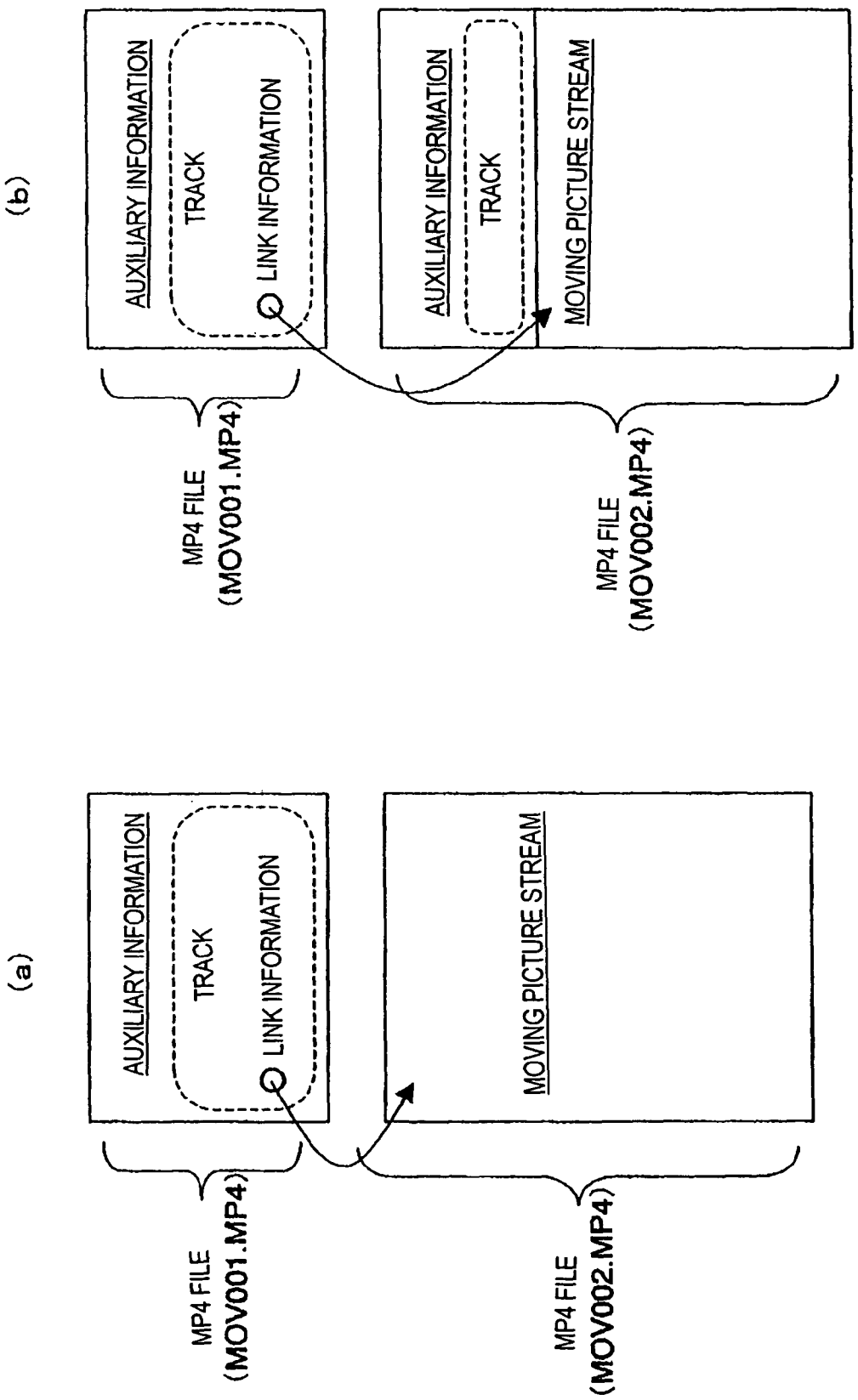
FIGS. 15(*a*) and 15(*b*) show alternative formats for the MP4 files.

FIG. 14 shows a specific format for the MP4 file 20. First, the moving picture stream 22 will be described. In the MP4 file 20, data in the moving picture stream is managed on a sample basis and on a chunk basis. As used herein, the "sample" is the smallest management unit of a stream in an MP4 file and may correspond to encoded frame data of a video frame or that of an audio frame. In FIG. 14, video samples representing frame data of video frames and audio samples representing frame data of audio frames are shown. On the other hand, the "chunk" refers to a set of one or more samples. Even if there is only one sample in a chunk, it is also managed as a chunk including just one sample.

In the auxiliary information 21, information about the video samples and information about the audio samples are managed on a track basis. A video track and an audio track are included in the auxiliary information 21 shown in FIG. 14. On each of these tracks, the sizes and playback durations of the respective samples and the top location of each chunk and the number of samples included in the chunk are described. The player can access every sample by reading each track of the auxiliary information 21 and can control the read operation on a sample-by-sample basis or on a chunk-by-chunk basis. It should be noted that the information on the storage location of each sample or each chunk in the management information of the MP4 file is equivalent to the "access data" mentioned above.

FIGS. 15(a) and 15(b) show alternative formats for an MP4 file. In FIG. 15(a), the auxiliary information and a moving picture stream 3 are provided as different MP4 files. In such a format, the auxiliary information 2 includes link information for controlling reading of the moving picture stream. Meanwhile, even if the auxiliary information and moving picture stream are arranged as a single MP4 file as shown in FIG. 15(b), the moving picture stream of that MP4 file can be referred to from the auxiliary information of another MP4 file.

Figure 16:
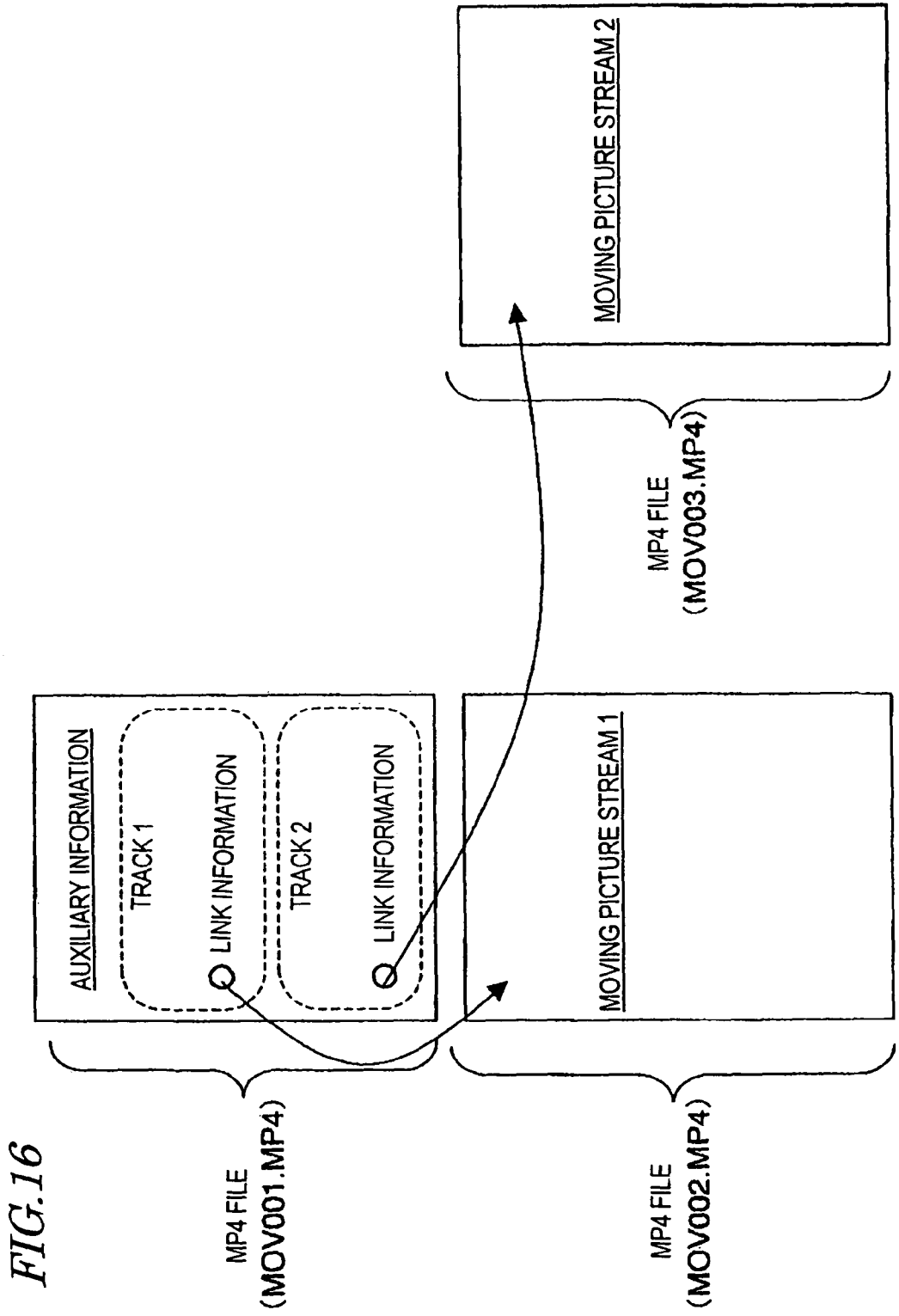
FIG. 16 shows still another format for MP4 files.

FIG. 16 shows still another format for MP4 files. As shown in FIG. 16, link information is defined for each of multiple tracks included in auxiliary information and two or more moving pictures may be referred to in accordance with the link information. For example, only a video stream may be stored in moving picture stream No. 1 and may be referred to from track No. 1 (e.g., a video track), while only an audio stream may be stored in moving picture stream No. 2 and may be referred to from track No. 2 (e.g., an audio track). In the auxiliary information, a plurality of video tracks and audio tracks may be contained. Optionally, any other type of tracks, such as a text track to refer to a file containing text information, may also be contained there.

Figure 17:
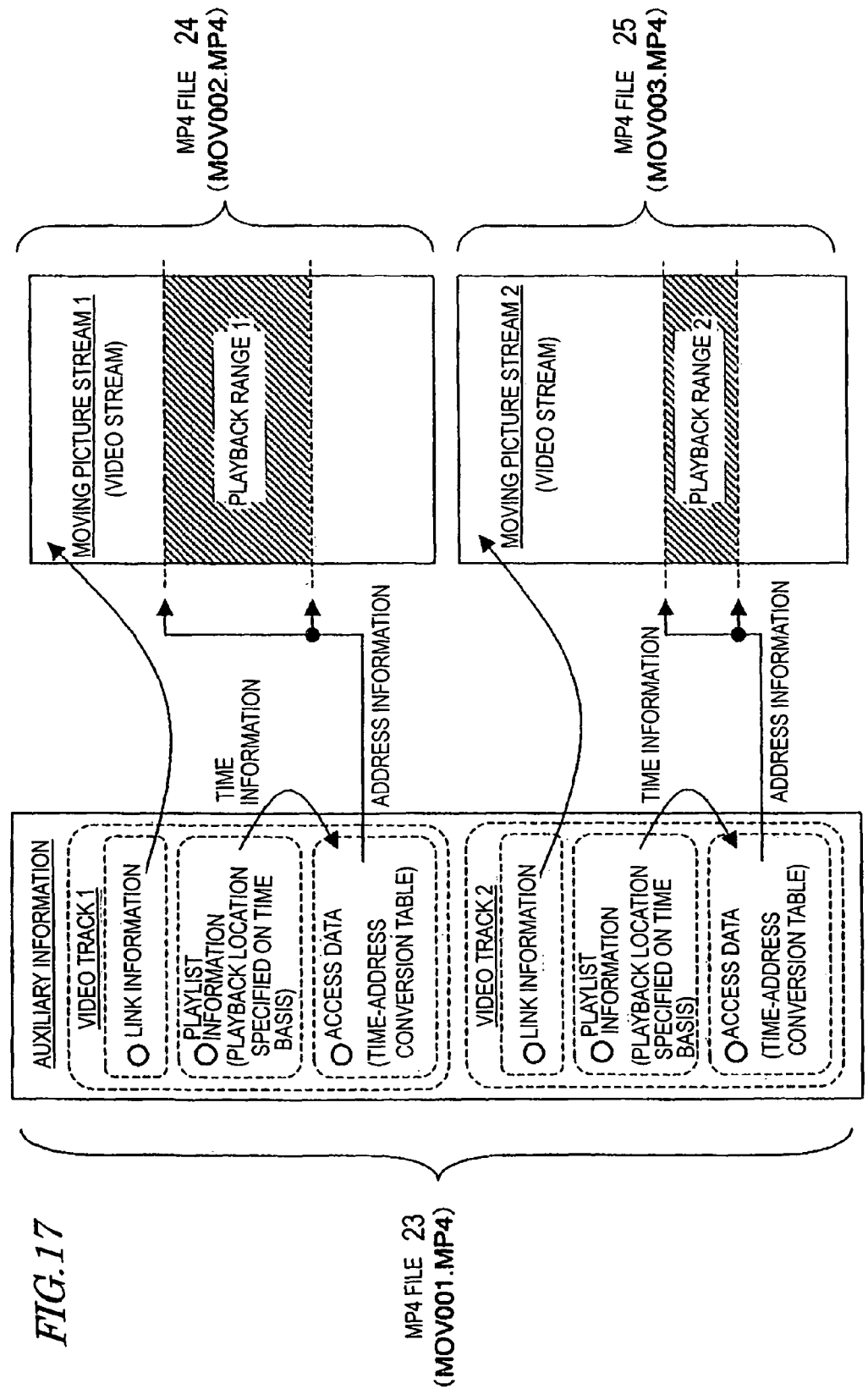
FIG. 17 shows the moving picture streams of MP4 files to be referred to by video tracks stored in an MP4 file 23.

Hereinafter, it will be described how to process moving picture streams and playlist information when the file format shown in FIG. 16 is adopted. FIG. 17 shows the moving picture streams of MP4 files to be referred to by video tracks stored in an MP4 file 23. The MP4 file 23 includes auxiliary information in which the two video tracks are present. On the other hand, the MP4 files 24 and 25 include moving picture streams to be referred to by the respective video tracks in the MP4 file 23. On the auxiliary information tracks, not only link information and access data but also playlist information are stored as well.

As already described for the foregoing preferred embodiments, the playlist information specifies the playback range of a moving picture stream by playback times. By reference to the access data, which is a time-address conversion table, the address of a video frame to be played back at the specified time can be detected easily. In the playlist information, the amount of time it takes to start playing back the desired video frame (i.e., an offset time) may also be included. Accordingly, the playback order of playback ranges Nos. 1 and 2 of the moving picture streams can be defined according to the correlation between the offset times. It should be noted that if there is no need to specify any playback range, no playlist information is provided.

Next, an example in which the playlist information and moving picture streams are stored in an MP4 file format on the optical disc 120 and semiconductor memory 121 will be described.

Figure 18:
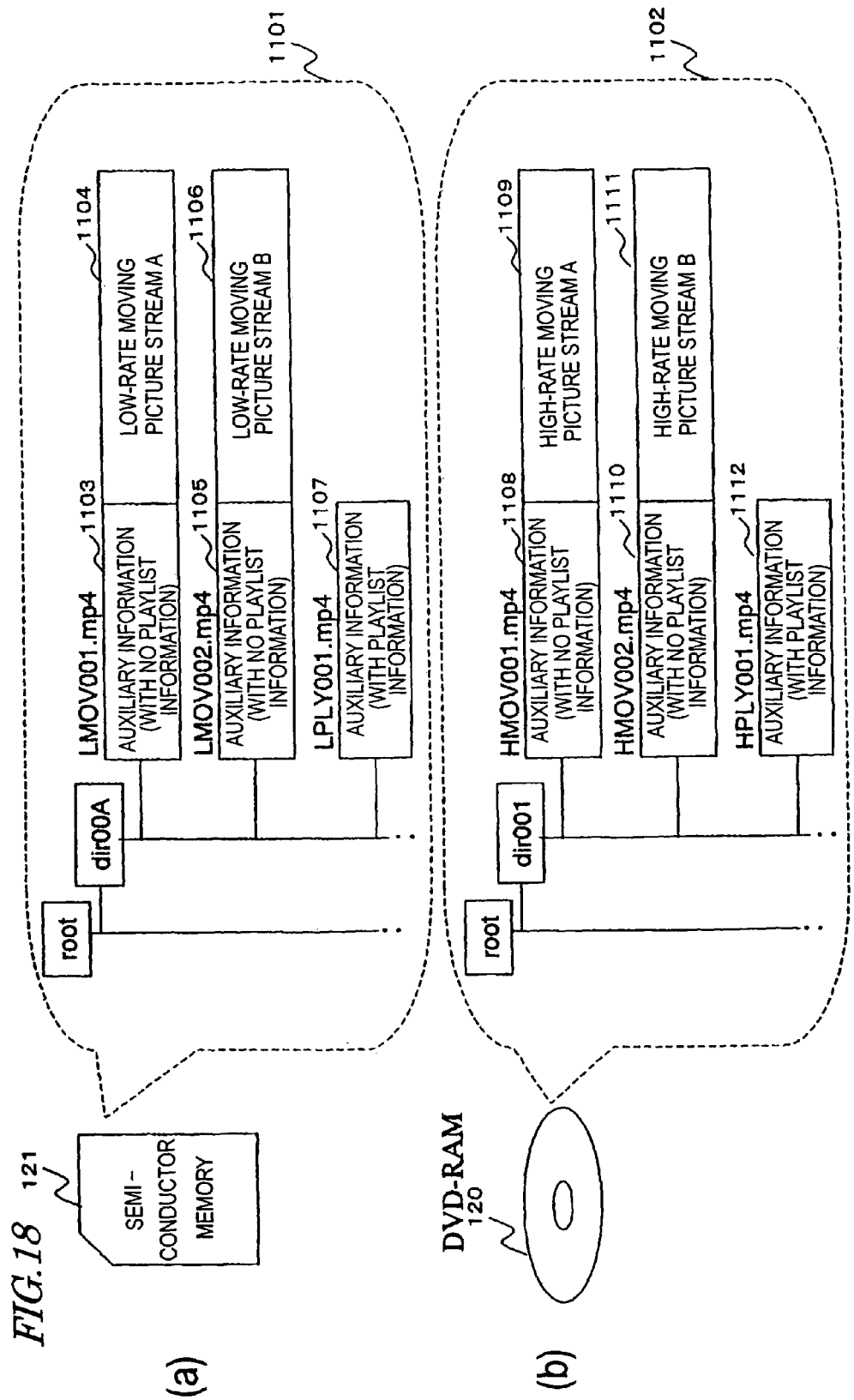
FIG. 18(*a*) shows the hierarchical structure 1101 of MP4 files and so on stored in the semiconductor memory 121, while FIG. 18(*b*) shows the hierarchical structure 1102 of MP4 files and so on stored on an optical disc 120.

FIG. 18(a) shows the hierarchical structure 1101 of MP4 files and so on stored in the semiconductor memory 121, while FIG. 18(b) shows the hierarchical structure 1102 of MP4 files and so on stored on an optical disc 120. The camcorder 100 and PC 201 can store data according to the file structures and formats shown in these drawings.

As shown in FIG. 18(a), the semiconductor memory 121 stores an MP4 file "LMOV001.mp4" consisting of a low-rate moving picture stream A 1104 and its auxiliary information 1103, another MP4 file "LMOV002.mp4" consisting of a low-rate moving picture stream B 1106 and its auxiliary information 1105, and still another MP4 file "LPLY001.mp4" consisting of auxiliary information 1107 only. The auxiliary information 1107 includes playlist information defining the playback locations and playback order for the respective low-rate moving picture streams 1104 and 1106, access data required to play back those streams and link information to the MP4 files "LMOV001.mp4" and "LMOV002.mp4" to refer to.

On the other hand, the optical disc 120 shown in FIG. 18(b) stores an MP4 file "HMOV001.mp4" consisting of a high-rate moving picture stream A 1109 and its auxiliary information 1108, another MP4 file "HMOV002.mp4" consisting of a high-rate moving picture stream A 1111 and its auxiliary information 1110, and still another MP4 file "HPLY001.mp4" consisting of auxiliary information 1112 only. The auxiliary information 1112 also includes playlist information defining the playback locations and playback order for the respective high-rate moving picture streams 1109 and 1111, access data required to play back those streams and link information to the MP4 files "HMOV001.mp4" and "HMOV002.mp4" to refer to.

The respective MP4 files shown in FIGS. 18(a) and 18(b) and the data and information that form those files may be generated following the processing steps as already described for the first preferred embodiment with reference to FIG. 7. For example, the low-rate moving picture streams A 1104 and A 1106 and the high-rate moving picture streams A 1109 and A 1111 may be generated and stored by the camcorder 100 for the same video. On the other hand, the auxiliary information 1107 including the playlist information for the low-rate moving picture streams is generated and stored by the PC 201. The auxiliary information 1112 including the playlist information for the high-rate moving picture streams is also produced and stored by the PC 201.

Figure 19:
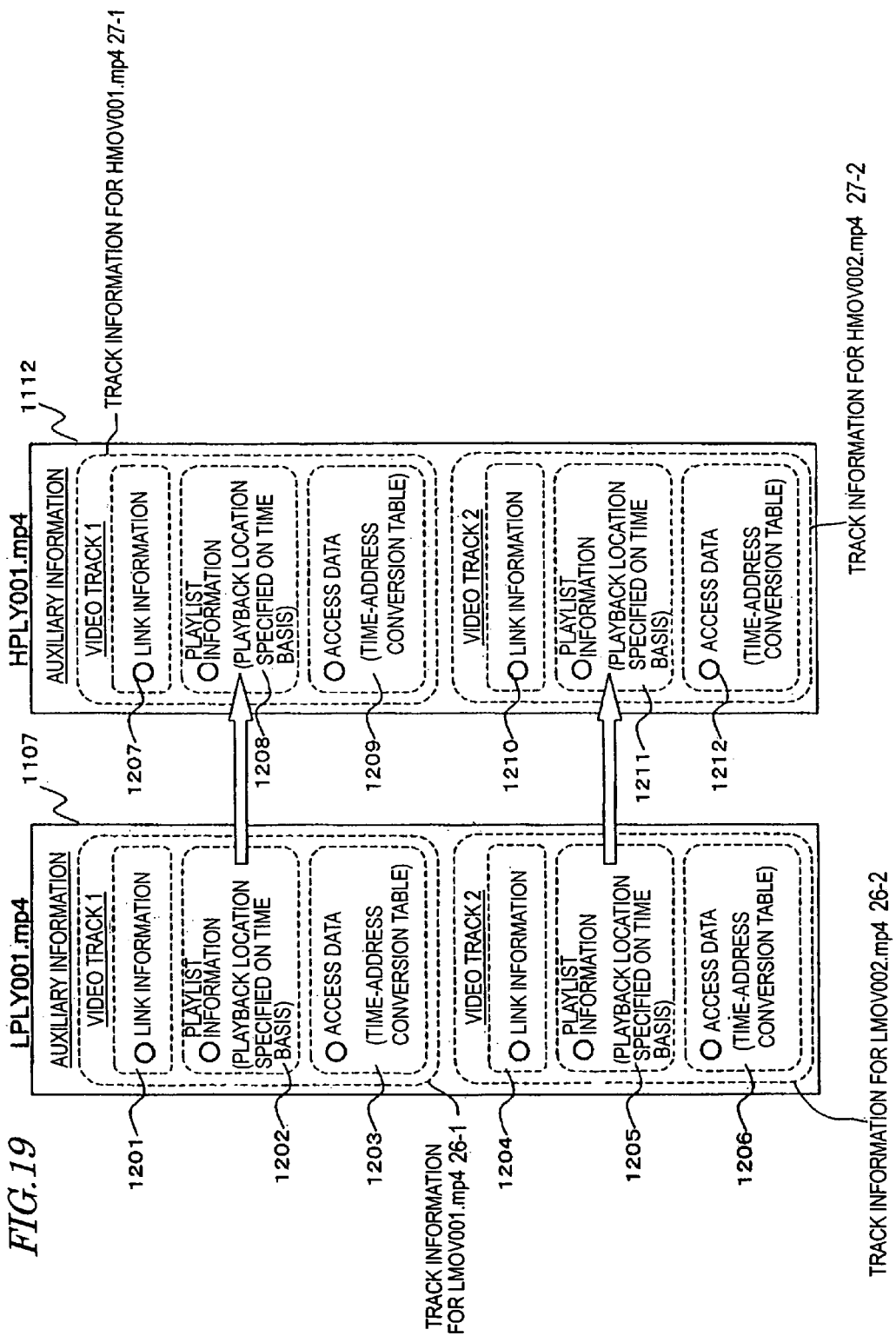
FIG. 19 shows a correlation between auxiliary information 1107 and auxiliary information 1112.

FIG. 19 shows a correlation between the auxiliary information 1107 and the auxiliary information 1112. The auxiliary information 1107 includes track information 26-1 and 26-2 for the two MP4 files to refer to. More specifically, the track information 26-1 is associated with the MP4 file "LMOV001.mp4", while the track information 26-2 is associated with the MP4 file "LMOV002.mp4".

The link information 1201 of the track information 26-1 contains link information to the MP4 file "LMOV001.mp4".

The playlist information 1202 contains the playback range and offset time of the low-rate moving picture stream A 1104, i.e., information for calculating the offset time to spend before the playback is started. The access data 1203 defines a time-address conversion table with respect to the low-rate moving picture stream A 1104. In the same way, the link information 1204 of the track information 26-2 contains link information to the MP4 file "LMOV002.mp4". The playlist information 1205 contains the playback range and offset time of the low-rate moving picture stream B 1106. The access data 1206 defines a time-address conversion table with respect to the low-rate moving picture stream B 1106.

The playlist information management section 110 and auxiliary information management section 111 of the camcorder 100 produce various types of information to store as the high-rate auxiliary information 1112 based on these pieces of information. The high-rate auxiliary information 1112 generated also includes track information 27-1 and 27-2 for the two MP4 files to refer to. More specifically, the track information 27-1 is associated with the MP4 file "HMOV001.mp4", while the track information 27-2 is associated with the MP4 file "HMOV002.mp4".

The link information 1207 of the track information 27-1 contains link information to "HMOV001.mp4" corresponding to "LMOV001.mp4", which is the destination of the link information 1201. The playlist information 1208 is produced based on the playlist information 1202 and then stored. If necessary, the access data 1209 may be generated by converting the access data of the auxiliary information 1108 of the MP4 file "HMOV001.mp4" to be linked to. The access data needs to be converted when respective video/audio frames have different data sizes or when respective files have different frame rates, for example. In any of these situations, the values of a data size table included in the access data are changed. In the same way, the link information 1210 of the track information 27-2 contains link information to "HMOV002.mp4". The playlist information 1211 may also be produced by converting the playlist information 1205, if necessary, and then stored. The access data 1212 may also be generated by converting the access data of the auxiliary information 1110 as needed.

As described above, the AV data recorder/player of the present invention is also applicable to a file format in which playlist information and access data are combined together, and can also achieve the same effects as those of the first preferred embodiment of the present invention.

In addition, by storing a low-rate moving picture stream as an MP4 file that complies with the MPEG4 system standard (ISO/IEC 14496-1) as in the example described above, any existent application compatible with MP4 files can be used without preparing any dedicated application software for producing playlist information for the PC 201. QuickTime of Apple Corporation is a typical application compatible with MP4 files.

A preferred embodiment of the present invention has been described as being applied to an MP4 file compliant with the MPEG4 system standard (ISO/IEC 14496-1). However, the present invention is in no way limited to that specific preferred embodiment. Rather the present invention is broadly applicable to any other file format as long as the correlation among the playlist information, access data and moving picture streams is sensible.

Embodiment 3

A processing technique for generating a high-rate moving picture stream and a low-rate moving picture stream at the same time in the type of processing shown in FIG. 4(a), for example, will be described as a third preferred embodiment of the present invention.

Figure 20:
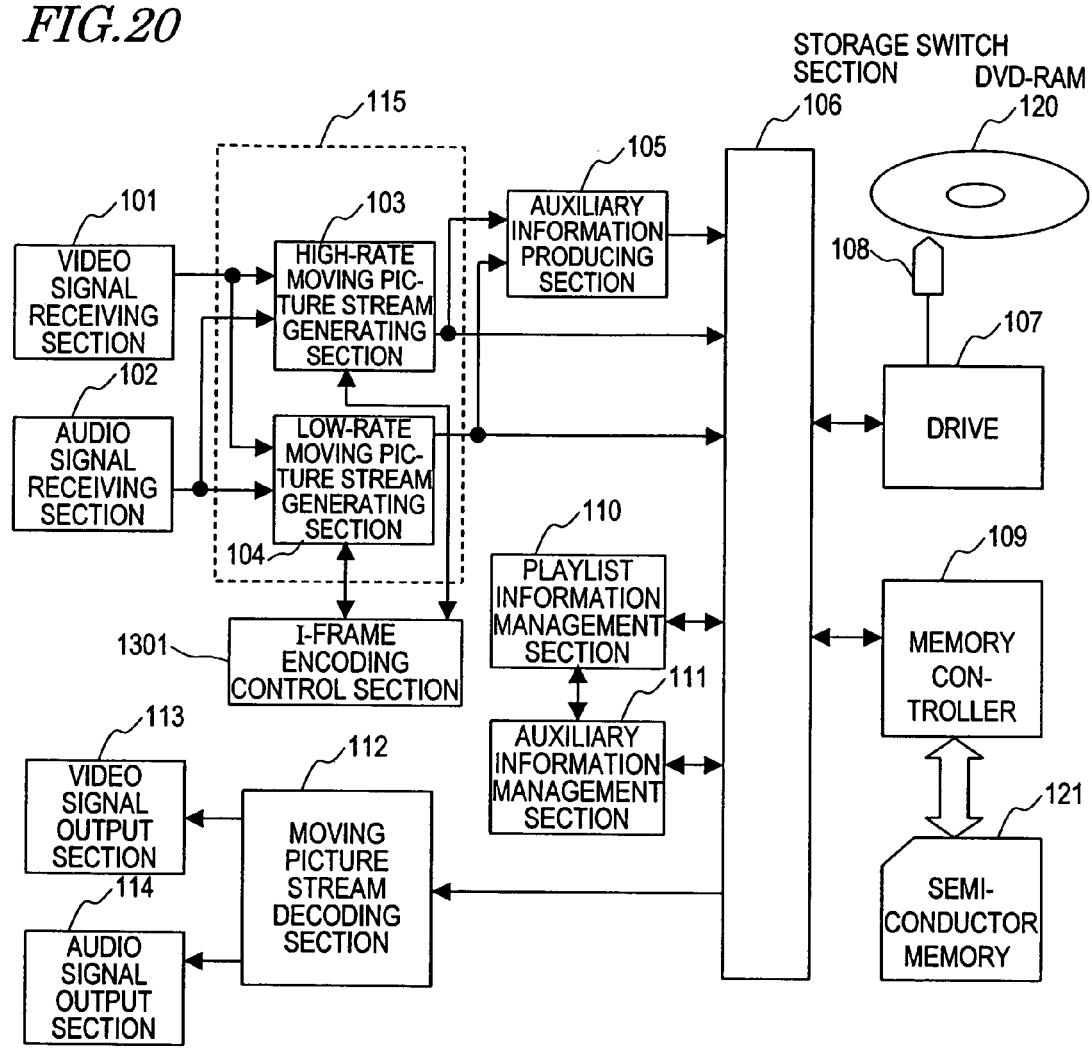
FIG. 20 is a block diagram of a data processor 200 according to a third preferred embodiment.

FIG. 20 shows an arrangement of functional blocks in a data processor 200 according to this third preferred embodiment. In this preferred embodiment, the data processor 200 is supposed to be a camcorder. Alternatively, the data processor 200 may also be implemented as a PC or a fixed DVD recorder, for example.

The camcorder 200 includes not only all components of the camcorder 100 of the first preferred embodiment but also an I-frame encoding control section 1301 (which will be simply referred to herein as an "encoding control section 1301"). The other components of the camcorder 200 are the same as the counterparts of the camcorder 100. Thus, each of those components of the camcorder 200 and the counterpart of the camcorder 100 are identified by the same reference numeral in the drawings and the description thereof will be omitted herein.

The encoding control section 1301 controls the encoding processes to be carried out while a high-rate moving picture stream and a low-rate moving picture stream, each including an MPEG video stream, are generated at the same time. More specifically, the encoding control section 1301 controls the high-rate stream generating section 103 and low-rate stream generating section 104 such that the respective I-frames of high- and low-rate moving picture streams associated with each other correspond to the same video frame.

In an MPEG video stream, respective frames of video are encoded and classified into the three types of I-frames, P-frames and B-frames. Among these frames, P-frames and B-frames are encoded based on inter-frame correlation. On the other hand, encoding of an I-frame is completed within that I-frame. That is to say, an I-frame may be decoded without using the data of any other frame as reference information. That is why an I-frame becomes an access point when playback of a moving picture stream is started from a halfway point thereof, for example.

Portions (a) through (c) of FIG. 21 show a correlation between the frame data in moving picture streams and video frames. Portion (b) of FIG. 21 shows a group of video frames that have been input to the video signal input section 101. Portion (a) of FIG. 21 shows a low-rate MPEG video stream included in a low-rate moving picture stream. Portion (c) of FIG. 21 shows a high-rate MPEG video stream included in a high-rate moving picture stream. The low-rate moving picture stream shown in portion (a) of FIG. 21 has been encoded so as to include only a part of the video frame data shown in portion (b). On the other hand, the high-rate moving picture stream shown in portion (c) of FIG. 21 has been encoded so as to include all of the video frame data shown in portion (b).

The high-rate moving picture stream generating section 103 encodes the shadowed ones of the frames shown in portion (b) of FIG. 21 as I-frames, thereby generating the high-rate moving picture stream shown in portion (c). On the other hand, the low-rate moving picture stream generating section 104 also encodes the shadowed frames shown in portion (b) of FIG. 21 as I-frames, thereby generating the low-rate moving picture stream shown in portion (a). These encoding processes are carried out under the instruction of the I-frame encoding control section 1301. It may be determined appropriately by a predetermined time interval, a data rate set for the low-rate moving picture stream or any other parameter which ones of the input video frames should be I-frames.

FIG. 21 illustrates an example in which each video frame is encoded as either an I-frame or a P-frame. However, even if encoding is carried out so as to generate B-frames, too, the same video frame may also be encoded as an I-frame in both low-rate and high-rate moving picture streams. Portions (a) through (c) of FIG. 22 show a correlation between the frame data in moving picture streams and video frames, which have been encoded as I-, P- and B-frames. In the examples illustrated in FIGS. 21 and 22, the high-rate and low-rate moving picture streams are encoded at mutually different frame rates. However, those streams may also be encoded at the same frame rate.

Hereinafter, it will be described what processing is carried out if the camcorder 100 shown in FIG. 4(a) is replaced with the camcorder 200 of this preferred embodiment. FIG. 23 shows a correlation between the low-rate moving picture streams A through C stored in the semiconductor memory 121 and playlist information 207 for low-rate playback. When the processing steps (1) to (3) shown in FIG. 4(a) are done, data with such a file structure is stored in the semiconductor memory 121.

In the playback range defined by the playlist information 207, an I-frame is specified as the top frame thereof. As described above, an I-frame may be used as an access point when the playback of a stream is started from a halfway point thereof. Thus, the player can start the playback smoothly from the beginning of the playback range. It should be noted that if a non I-frame were specified as the top frame of a playback range, then start of the decoding process should be retroactive to an I-frame that is needed to decode that frame. In that case, the playback of a moving picture stream could not be carried out smoothly in accordance with the playlist information.

In the processing shown in FIG. 4(a), if the semiconductor memory 121, in which the low-rate playlist information 206 is stored, is loaded into the camcorder 200, high-rate playlist information is produced and stored on the optical disc 120. FIG. 24 shows a correlation between the high-rate moving picture streams A through C stored on the optical disc 120 and playlist information 507 for high-rate playback. In FIGS. 23 and 24, the same video frame is encoded as an I-frame. Accordingly, in the playback range defined by the high-rate playlist information 507, an I-frame is also specified as the top frame thereof. As a result, as to these high-rate moving picture streams, the player can also start the playback smoothly from the beginning of the playback range.

As to this preferred embodiment, file structures, operations and so on have been described with respect to the processing shown in FIG. 4(a). However, this is just an example and the same technique is applicable to generating a plurality of moving picture streams with different data rates from the same video. For example, this preferred embodiment is also applicable to the processing shown in FIG. 4(b) or to a situation where high-rate and low-rate moving picture streams are stored on the optical disc 120 at the same time and then the low-rate moving picture stream is copied or moved onto the semiconductor memory.

Also, a preferred embodiment of the present invention has been described as being applied to I-, P- and B-frames of a moving picture stream. However, those frames may be replaced with fields including I-, P- and B-fields. A "picture" may be used as a generic term that may mean either a frame or a picture.

Embodiment 4

Hereinafter, a processing technique of producing playlist information for two different encoding rates in accordance with playlist information that defines playback effects such as fade and wipe will be described as a fourth preferred embodiment of the present invention. The processing technique of this preferred embodiment may be applied to the processing shown in FIG. 4(a), for example. That is why this preferred embodiment will be described with the camcorder 100 and PC 201 shown in FIG. 4(a) adopted. More specifically, the processing technique to be described below is applied after the processing steps (1) to (3) shown in FIG. 4(a) have been carried out.

FIG. 25 shows the low-rate moving picture streams A through C stored in the semiconductor memory 121 and their playlist information. The playlist information of this preferred embodiment defines an IN-point transition effect, an OUT-point transition effect and a playback effect, as well as all parameters included in the playlist information of the first preferred embodiment. As used herein, the "transition effect" is a kind of playback effect to produce at either a playback start point or end point of a moving picture stream.

The transition effects will be described with reference to FIG. 25. First, as "fade" is specified as the IN-point transition effect for playback range #1, the effect of making video gradually visible out of all-white background is added to the top of the playback range of the low-rate moving picture stream A.

Next, as "wipe" is specified as the IN-point transition effect for playback range #2, the video of the low-rate moving picture stream B starts to be played back so as to gradually overlap with the video of the low-rate moving picture stream A. Furthermore, as "mosaic" is specified as the playback effect (steady state) of the playback range #2, the low-rate moving picture stream B is played back as mosaic video throughout that playback range. The OUT-point transition effect on the low-rate moving picture stream B is "none" and "mix" is specified as the IN-point transition effect on the playback range #3. Accordingly, as soon as the playback of the video of the low-rate moving picture stream B ends, the top of the low-rate moving picture stream C starts to be played back with a combination of playback effects such as "fade" and "wipe" produced.

Thereafter, as the playback effect (steady state) of the playback range #3 is "none", the low-rate moving picture stream C is played back as it is with no playback effect produced. Finally, as the OUT-point transition effect on the low-rate moving picture stream C is "fade", the video of the low-rate moving picture stream C gradually fades out.

Various effects may be additionally specified by the playlist information as described above. For example, according to a PC application such as QuickTime of Apple Corporation, those effects may be defined by the playlist information and added to a moving picture stream being played back.

However, the performance of some players may be high enough to add those playback effects to a low-rate moving picture stream but not so high as to add the same playback effects to a high-rate moving picture stream.

That is why if playback effects are defined by low-rate playlist information, the camcorder 100 of this preferred embodiment obtains high-rate playlist information by either changing and/or deleting the playback effects according to a predetermined conversion rule.

FIG. 26 shows the high-rate moving picture streams A through C stored in the semiconductor memory 121 and playlist information in which playback effects have been either changed or deleted. Comparing FIGS. 25 and 26, it can be seen that all playback effects but "fade" defined as the IN-point and OUT-point transition effects (i.e., effects in the dashed square 31) have been replaced with "fade" and that the steady-state playback effect on the playback range #3 (i.e., effect in the dashed square 32) has been deleted.

The processing of producing the high-rate playlist information is carried out in accordance with a rule that only the "fade" effect is allowed as the IN-point or OUT-point transition effect and that "monochrome" as the steady-state playback effect should be deleted.

Optionally, the playlist information management section 110 may retain a playback effect conversion table and produce the high-rate playlist information by reference to that conversion table. The following Table 1 is such a playback effect conversion table:

TABLE 1

| Playback effect to convert | Converted playback effect |
|---|---|
| Wipe | Fade |
| Mix | Fade |
| Monochrome | None |
| ... | ... |

The playlist information management section 110 refers to the playback effect conversion table. If the playback effect to convert is included in the low-rate playlist information, then the playlist information management section 110 may convert the playback effect. Even by using such a conversion table, the high-rate playlist information shown in FIG. 26 can be produced based on the low-rate playlist information shown in FIG. 25.

In the preferred embodiment described above, the camcorder 100 is supposed to convert the playback effects as defined by the playlist information in the processing shown in FIG. 4(a). However, this preferred embodiment is also applicable to the processing shown in FIG. 4(b). For example, if the user has made a playlist of high-rate moving picture streams, the PC 201 may check the playback effects. The playlist information management section 110 may produce the high-rate playlist information by changing and/or deleting some playback effects, which turn out against the rules described above as a result of the check. In producing low-rate playlist information after that, the playlist information management section 110 may adopt the unchecked playlist information.

In the foregoing description, the high-rate playlist information is supposed to be produced based on the low-rate playlist information. Alternatively, the low-rate playlist information may be produced based on the high-rate playlist information conversely.

Furthermore, the present invention is also applicable to an apparatus for editing high-rate moving picture streams in accordance with playlist information for a low-rate moving picture stream. FIG. 27 shows a high-rate moving picture stream D generated by extracting respective playback ranges of high-rate moving picture streams A through C. The respective playback ranges of the high-rate moving picture streams A through C are defined by the playlist information. However, this playlist information specifies playback ranges on a time basis, no matter whether the playlist information is used for low-rate playback or high-rate playback. Accordingly, the high-rate moving picture streams can be edited by reference to the low-rate playlist information. That is to say, by extracting respective playback ranges from the high-rate moving picture streams and re-defining time stamps representing playback times in accordance with the playlist information, the high-rate moving picture stream shown in FIG. 27 can be generated.

In each of the first through fourth preferred embodiments of the present invention described above, the data files of low-rate moving picture streams are exchanged between the camcorder 200 and the PC 201 by way of the semiconductor memory 121 and the optical disc 120. However, those data files may also be exchanged by way of any other communication medium such as a cable or even by wireless communication. FIG. 28 shows an example in which a camcorder 300 and the PC 201 are connected together with a digital IF cable 30 such as a USB cable. The digital IF cable 30 is connected between the connection interface 28 of the camcorder 300 and that of the PC 201. It should be noted that when the cable 30 is used, the function of storing information in the semiconductor memory 121 is not always required. FIG. 29 shows an arrangement of functional blocks in the camcorder 300. Comparing this camcorder 300 with the counterpart 100 shown in FIG. 5, it can be seen that no memory controller 109 is provided and the interface 28 to connect the cable 30 is added. Optionally, the camcorder 300 may further include the encoding control section 1301 of the camcorder 200 shown in FIG. 20 and perform the same processing as the camcorder 200.

The storage medium is supposed herein to be a DVD-RAM disc but is not particularly limited thereto. Alternatively, any other optical storage medium such as an MO, a DVD-R, a DVD-RW, a DVD+RW, a CD-R or a CD-RW, a magnetic recording medium such as a hard disk or even a semiconductor storage medium such as a semiconductor memory may also be used. In the processing shown in FIG. 4(b), however, the storage medium is preferably a removable storage medium on which a high-rate moving picture stream can be stored.

A data processor according to the present invention, such as a camcorder or a PC, may perform the processing described above according to a computer program. Such processing may be carried out by executing a computer program that is described for each of those data processors based on the flowchart shown in FIG. 7 or 12. The computer program may be stored in any of various types of storage media. Examples of preferred storage media include optical storage media such as optical discs, semiconductor storage media such as an SD memory card and an EEPROM, and magnetic recording media such as a flexible disk. Instead of using such a storage medium, the computer program may also be downloaded via a telecommunications line (e.g., through the Internet, for example) and installed in the optical disc drive 100.

INDUSTRIAL APPLICABILITY

According to the present invention, a data processor, which can record a plurality of moving picture streams at different data rates with respect to the same video, manages a moving picture stream recorded at the higher rate and a moving picture stream recorded at the lower rate in association with each other. For example, the data processor may produce playlist information for the high-rate moving picture stream based on playlist information for the low-rate moving picture stream that has been produced by another apparatus.

Also, in the data processor of the present invention, after some streams have been captured with a camcorder, that troublesome editing work of those streams may be carried out with a PC, thereby producing playlist information for high-rate moving picture streams from the playlist file for completed low-rate moving picture streams. Thus, the playlist can be compiled without performing any complicated input work on the camcorder to make the playlist. Furthermore, since the user makes the playlist by using low-rate moving picture streams, the processing load on an external unit that should process those streams can be reduced, too. Consequently, compared with a situation where the same work is carried out on high-rate moving picture streams, the expected response of the equipment should be faster. What is more, since the low-rate moving picture streams are output to the external unit, the semiconductor memory to store those moving picture streams may have a smaller capacity compared with storing high-rate moving picture streams.

On top of that, if an I-frame is specified as a playback start frame in making a playlist of low-rate moving picture streams, then a playlist of high-rate moving picture streams automatically specifies an I-frame as a playback start frame. Thus, streams can be switched smoothly during the playlist playback.

Furthermore, even if the PC application and the data processor can cope with transition effects or playback effects to different degrees, an AV data recorder/player can also produce playlist information for high-rate moving picture streams based on playlist information for low-rate moving picture streams that has been produced by the PC application.

Besides, even when data is exchanged with an external unit by way of a digital IF cable such as a USB cable or by some wireless communication means, low-rate moving picture streams are output to the external unit. Consequently, the processing load on the camcorder and external unit can be reduced as compared with a situation where high-rate moving picture streams are output.

The invention claimed is:

1. A data processor for reading data from and writing data on a storage medium, the storage medium having stored thereon a first data stream being represented by a video signal that has been encoded by a first encoding process,
the data processor comprising:
a controller for acquiring first playlist information which is used to manage playback of the first data stream;
a stream generating section for generating a second data stream by encoding the video signal by a second encoding process, which is different from the first encoding process; and
a management section for producing second playlist information based on the second data stream and the first playlist information so as to manage an order in which the second data stream is played back.

2. The data processor of claim 1, further comprising a first storage section for storing the first data stream on the storage medium and a second storage section for storing the second data stream on another storage medium,
wherein the stream generating section generates the first and second data streams in parallel.

3. The data processor of claim 2, wherein the stream generating section generates the first and second data streams such that each said stream includes a plurality of data streams.

4. The data processor of claim 2, wherein the controller acquires the first playlist information that includes stream identifying information, which identifies each of more than one stream included in the first data stream, and range information, which specifies the playback range of each said stream, and
wherein from the stream identifying information and the range information, the management section produces the second playlist information that includes stream identifying information, which identifies an associated one of more than one stream included in the second data stream, and range information, which specifies the playback range of each said stream.

5. The data processor of claim 4, wherein the controller acquires the first playlist information that specifies a playback effect on the first data stream, and
wherein the management section produces the second playlist information that specifies another playback effect, which is different from the playback effect on the first data stream, for the second data stream.

6. The data processor of claim 5, wherein the management section specifies the playback effect on the second data stream according to the type of the playback effect on the first data stream.

7. The data processor of claim 4, wherein each said range information included in the first and second playlist information designates an I-picture, compliant with an MPEG standard, as a start position of the playback range.

8. The data processor of claim 7, further comprising an encoding control section for giving an instruction on how to generate I-pictures compliant with the MPEG standard,
wherein in accordance with the instruction of the encoding control section, the stream generating section generates the first and second data streams such that each pair of I-pictures in the first and second data streams are associated with the same video picture.

9. The data processor of claim 2, further comprising an image pickup section for acquiring the video signal and a microphone for acquiring an audio signal,
wherein the stream generating section generates the first and second data streams such that each said stream further includes the audio signal.

10. The data processor of claim 1, further comprising:
a commanding section for receiving an instruction on the playback order of the first data stream, and
a writing section for writing the first playlist information, the second data stream and the second playlist information on the storage medium,
wherein the controller produces the first playlist information in accordance with the instruction, and the stream generating section generates the second data stream based on the first data stream.

11. A data processing method for reading data from and writing data on a storage medium, the storage medium having stored thereon a first data stream being represented by a video signal that has been encoded by a first encoding process,
the method comprising steps of:
acquiring first playlist information which is used to manage playback of the first data stream;
generating a second data stream by encoding the video signal by a second encoding process, which is different from the first encoding process; and
producing second playlist information based on the second data stream and the first playlist information so as to manage an order in which the second data stream is played back.

12. The data processing method of claim 11, further comprising steps of:
generating the first data stream in parallel with the second data stream;

storing the first data stream on the storage medium; and
storing the second data stream on another storage medium.

13. The data processing method of claim 12, wherein the step of generating the first data stream includes generating the first data stream such that the first data stream includes a plurality of data streams, and
wherein the step of generating the second data stream includes generating the second data stream such that the second data stream includes a plurality of data streams.

14. The data processing method of claim 12, wherein the step of acquiring the first playlist information includes acquiring the first playlist information that includes stream identifying information, which identifies each of more than one stream included in the first data stream, and range information, which specifies the playback range of each said stream, and
wherein the step of producing the second playlist information includes producing the second playlist information that includes stream identifying information, which identifies an associated one of more than one stream included in the second data stream, and range information, which specifies the playback range of each said stream, from the stream identifying information and the range information.

15. The data processing method of claim 14, wherein the step of acquiring the first playlist information includes acquiring the first playlist information that specifies a playback effect on the first data stream, and
wherein the step of producing the second playlist information includes producing the second playlist information that specifies another playback effect, which is different from the playback effect on the first data stream, for the second data stream.

16. The data processing method of claim 15, wherein the step of producing the second playlist information includes producing the second playlist information by specifying the playback effect on the second data stream according to the type of the playback effect on the first data stream.

17. The data processing method of claim 14, wherein each said range information included in the first and second playlist information designates an I-picture, compliant with an MPEG standard, as a start position of the playback range.

18. The data processing method of claim 17, further comprising a step of giving an instruction on how to generate I-pictures compliant with the MPEG standard,
wherein the step of generating the first data stream and the step of generating the second data stream include generating the first and second data streams in accordance with the instruction such that each pair of I-pictures in the first and second data streams are associated with the same video picture.

19. The data processing method of claim 12, further comprising steps of:
acquiring the video signal; and
acquiring an audio signal,
wherein the step of generating the first data stream and the step of generating the second data stream include generating the first and second data streams such that each said stream further includes the audio signal.

20. The data processing method of claim 11, further comprising steps of:
receiving an instruction on the playback order of the first data stream; and
writing the first playlist information, the second data stream and the second playlist information on the storage medium,
wherein the step of acquiring the first playlist information includes producing the first playlist information in accordance with the instruction, and
wherein the step of generating the second data stream includes generating the second data stream based on the first data stream.

21. A recording medium having stored thereon a computer program which is executed by a computer in reading data from and writing data on a storage medium,
the storage medium having stored thereon a first data stream being represented by a video signal that has been encoded by a first encoding process,
the computer program instructing the computer to execute the processing steps of:
acquiring first playlist information which is used to manage playback of the first data stream;
generating a second data stream by encoding the video signal by a second encoding process, which is different from the first encoding process; and
producing second playlist information based on the second data stream and the first playlist information so as to manage an order in which the second data stream is played back.

* * * * *